(12) United States Patent
Weiler

(10) Patent No.: US 8,160,750 B2
(45) Date of Patent: Apr. 17, 2012

(54) PROGRAMMABLE IRRIGATION CONTROLLER HAVING USER INTERFACE

(75) Inventor: Steven W. Weiler, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 1069 days.

(21) Appl. No.: 11/424,504

(22) Filed: Jun. 15, 2006

(65) Prior Publication Data
US 2006/0293797 A1    Dec. 28, 2006

Related U.S. Application Data

(60) Provisional application No. 60/691,616, filed on Jun. 17, 2005.

(51) Int. Cl.
| | |
|---|---|
| G05D 11/00 | (2006.01) |
| G06F 17/00 | (2006.01) |
| G01R 13/02 | (2006.01) |
| G05B 11/01 | (2006.01) |
| A01G 27/00 | (2006.01) |

(52) U.S. Cl. ......... 700/284; 700/17; 702/68; 348/14.03; 706/11; 239/69

(58) Field of Classification Search .................... 700/16, 700/284, 17; 239/63, 64, 69, 70, 99; 706/11; 702/68; 348/14.03; 715/700
See application file for complete search history.

(56) References Cited

U.S. PATENT DOCUMENTS

| | | | |
|---|---|---|---|
| 4,165,532 A | 8/1979 | Kendall et al. | |
| 4,189,776 A | 2/1980 | Kendall | |
| 4,569,020 A * | 2/1986 | Snoddy et al. ................ 700/284 |
| 4,646,224 A | 2/1987 | Ransburg et al. | |
| 4,797,820 A | 1/1989 | Wilson et al. | |
| 4,827,155 A | 5/1989 | Firebaugh | |
| 4,852,051 A | 7/1989 | Mylne, III | |
| 4,937,732 A | 6/1990 | Brundisini | |
| 4,937,746 A | 6/1990 | Brundisini | |
| 4,943,917 A | 7/1990 | Mylne, III | |
| 4,951,204 A | 8/1990 | Mylne, III | |
| 5,038,268 A | 8/1991 | Krause et al. | |
| 5,097,861 A | 3/1992 | Hopkins et al. | |
| 5,262,936 A | 11/1993 | Faris et al. | |
| 5,272,620 A | 12/1993 | Mock et al. | |

(Continued)

FOREIGN PATENT DOCUMENTS

EP    0 805 381    11/1997

(Continued)

OTHER PUBLICATIONS

International Searching Authority, International Search Report and Written Opinion, WIPO, Feb. 22, 2007, pp. 1-8.

(Continued)

*Primary Examiner* — Kakali Chaki
*Assistant Examiner* — Sheela Rao
(74) *Attorney, Agent, or Firm* — Fitch Even Tabin & Flannery LLP

(57) ABSTRACT

An irrigation controller includes a user interface capable of presenting information to a user and allowing the programming of the controller in a simple and intuitive fashion. Information presented may include values of all programmable irrigation parameters associated with an irrigation zone. Information presented may include values of irrigation parameters associated with multiple irrigation zones. Information may also be presented graphically, in color, and/or in a plurality of languages.

28 Claims, 14 Drawing Sheets

U.S. PATENT DOCUMENTS

| | | | |
|---|---|---|---|
| 5,329,082 | A | 7/1994 | Saarem |
| 5,363,290 | A | 11/1994 | Doup et al. |
| 5,381,331 | A | 1/1995 | Mock et al. |
| 5,414,618 | A | 5/1995 | Mock et al. |
| 5,438,180 | A | 8/1995 | Eisenbrandt et al. |
| 5,444,611 | A | 8/1995 | Woytowitz et al. |
| 5,479,338 | A | 12/1995 | Ericksen et al. |
| 5,479,339 | A * | 12/1995 | Miller .............................. 700/16 |
| 5,568,376 | A | 10/1996 | Benmergui et al. |
| 5,602,728 | A | 2/1997 | Madden et al. |
| 5,921,280 | A | 7/1999 | Ericksen et al. |
| 6,240,325 | B1 | 5/2001 | Brundisini |
| 6,240,336 | B1 | 5/2001 | Brundisini |
| 6,259,955 | B1 | 7/2001 | Brundisini et al. |
| 6,442,440 | B1 | 8/2002 | Miller |
| 6,490,505 | B1 | 12/2002 | Simon et al. |
| 6,507,775 | B1 | 1/2003 | Simon et al. |
| 6,647,319 | B1 | 11/2003 | Goldberg |
| 6,694,223 | B1 | 2/2004 | Goldberg et al. |
| 6,708,084 | B2 | 3/2004 | Battistutto et al. |
| 6,721,630 | B1 | 4/2004 | Woytowitz |
| 6,772,050 | B2 | 8/2004 | Williams et al. |
| 6,950,728 | B1 | 9/2005 | Addink et al. |
| 6,996,457 | B2 | 2/2006 | Williams et al. |
| 7,003,357 | B1 | 2/2006 | Kreikemeier et al. |
| 7,058,479 | B2 | 6/2006 | Miller |
| 7,069,115 | B1 | 6/2006 | Woytowitz |
| 7,096,094 | B2 | 8/2006 | Addink et al. |
| 7,123,993 | B1 | 10/2006 | Freeman et al. |
| 7,203,576 | B1 * | 4/2007 | Wilson et al. ................. 700/284 |
| 2002/0002425 | A1 * | 1/2002 | Dossey et al. ................. 700/284 |
| 2003/0097188 | A1 * | 5/2003 | O'Mahoney et al. ........... 700/17 |
| 2003/0120357 | A1 | 6/2003 | Battistutto et al. |
| 2003/0178070 | A1 * | 9/2003 | Glicken .................. 137/624.11 |
| 2003/0182022 | A1 * | 9/2003 | Addink et al. ................ 700/284 |
| 2005/0060065 | A1 | 3/2005 | King-Yuan |
| 2005/0171646 | A1 | 8/2005 | Miller |
| 2005/0203669 | A1 * | 9/2005 | Curren .......................... 700/284 |
| 2005/0267641 | A1 | 12/2005 | Nickerson et al. |
| 2005/0273205 | A1 * | 12/2005 | Nickerson et al. ............ 700/284 |
| 2005/0283359 | A1 * | 12/2005 | Lin et al. ............................ 704/8 |
| 2006/0030971 | A1 | 2/2006 | Nelson et al. |
| 2006/0116792 | A1 | 6/2006 | Addink |
| 2006/0122735 | A1 | 6/2006 | Goldberg et al. |
| 2006/0152525 | A1 * | 7/2006 | Woog ............................ 345/589 |
| 2006/0178781 | A1 | 8/2006 | Simon et al. |
| 2006/0184284 | A1 | 8/2006 | Froman et al. |
| 2006/0217845 | A1 | 9/2006 | Simon et al. |
| 2007/0198099 | A9 * | 8/2007 | Shah ................................. 700/1 |
| 2007/0257120 | A1 * | 11/2007 | Chapman et al. ............... 236/94 |
| 2009/0227855 | A1 * | 9/2009 | Hill et al. ....................... 600/365 |

FOREIGN PATENT DOCUMENTS

| | | |
|---|---|---|
| GB | 2 097 555 | 11/1982 |
| WO | WO 2004/046872 | 6/2004 |
| WO | WO 2006-138591 A2 | 12/2006 |

OTHER PUBLICATIONS

Rain Bird, "Installation and Operation Guide, Controller Unit IM," Apr. 2002, pp. 82-86, Rain Bird Corporation, Glendora, CA.

Hunter Industries, "Hunter ICC Controllers, Features & Benefits," pp. 66-67, Hunter Industries Incorporated, San Marcos, CA.

Hunter Industries, "Hunter ICC Controllers, Product Features & Benefits," pp. 6, Hunter Industries Incorporated, San Marcos, CA.

Nomis, "The Nomis 8 Zone Timer," commercially available prior to Jun. 15, 2006, 1 page, http://web.archive.org/web/20050209061531/http://www.nomistimer.com/.

PCT; App. No. PCT/US2006/023530; International Preliminary Report on Patentability mailed Dec. 17, 2007.

Rain Bird, "IM Series Controllers", Mar. 2002, pp. 1-5, Rain Bird Corporation, Azuza, CA.

Rain Bird, "IM Series Controllers: Advanced Stand-Alone Irrigation Manager (IM)", Dec. 2003, pp. 1-4, Rain Bird Corporation, Azusa, CA.

Rain Bird, "Installation and Operation Guide: Controller Unit IM", Apr. 2002, 124 pages, Rain Bird Corporation, Tucson, AZ.

Agipa; App. No. 2006259244; Examiner's First Report mailed Mar. 4, 2010.

EPO; App. No. 06 773 374; Supplementary European Search Report mailed May 11, 2011.

* cited by examiner

PROGRAMMABLE IRRIGATION
CONTROLLER HAVING USER INTERFACE

This application claims the benefit of U.S. Provisional Application No. 60/691,616, filed Jun. 17, 2005, which is incorporated in its entirety herein by reference.

BACKGROUND

1. Field of Invention

Embodiments exemplarily described herein relate generally to user interfaces of programmable irrigation controllers and methods of presenting information to users of irrigation controllers.

2. Discussion of the Related Art

Generally, programmable irrigation controllers are used to control the delivery of water to irrigation devices connected to switchable irrigation valves. To control the delivery of water to groups of irrigation devices that define irrigation stations or zones, users (e.g., residential users) of conventional program-based irrigation controllers typically create programs that define different watering days and start times for each watering day. Once a program is created, the user selects which programs to apply to which zones, thereby creating an irrigation schedule for each switchable irrigation valve.

Because users often intuitively think in terms of irrigation events that will occur within a particular zone, rather than in terms of abstract programs that are assigned to zones, irrigation schedules can be difficult to establish using program-based irrigation controllers.

User interfaces of conventional program-based irrigation controllers include some arrangement of a display panel (such as a segmented LCD screen) and one or more dials, switches, or buttons. Such user interfaces, however, typically do not show all parameters associated with an irrigation schedule at one time. As a result, it can be difficult for users of conventional program-based irrigation controllers to get a complete picture of any particular irrigation schedule. Thus, for many users, the user interface can be confusing and difficult to understand.

SUMMARY

Several embodiments exemplarily described herein address the needs above as well as other needs by providing a programmable irrigation controller having a user interface.

One embodiment exemplarily described herein relates to an irrigation controller that includes a housing; a microcontroller within the housing and adapted to store and execute an irrigation schedule; a valve driver coupled to the microcontroller and adapted to output a zone activation signal to an actuatable zone valve in response to signaling from the microcontroller; and a user interface. The user interface includes a plurality of user input devices coupled to the microcontroller and adapted to provide signaling to the microcontroller based upon a user's engagement therewith, the plurality of user input devices adapted to allow the user to create an irrigation schedule; and a user display coupled to the microcontroller and adapted to display irrigation parameters associated with the irrigation schedule, the user display comprising a display screen. The microcontroller is adapted to cause the user display to display all system variables associated with the irrigation schedule together to the user.

Another embodiment exemplarily described herein relates to an irrigation controller that includes a housing; a microcontroller within the housing and adapted to store and execute an irrigation schedule; a valve driver coupled to the microcontroller and adapted to output a zone activation signal to an actuatable zone valve in response to signaling from the microcontroller; and a user interface. The user interface includes a plurality of user input devices coupled to the microcontroller and adapted to provide signaling to the microcontroller based upon a user's engagement therewith, the plurality of user input devices adapted to allow the user to create an irrigation schedule; and a user display coupled to the microcontroller and adapted to display irrigation parameters associated with the irrigation schedule. The microcontroller is adapted to cause the user display to display at least one of a next irrigation start day, a next irrigation start time, and a next zone to irrigate associated with the irrigation schedule.

Another embodiment exemplarily described herein relates to an irrigation controller that includes a housing; a microcontroller within the housing and adapted to store and execute a plurality of irrigation schedules; a plurality of valve drivers coupled to the controller, each adapted to output a zone activation signal to an actuatable zone valve in response to signaling from the microcontroller; and a user interface. The user interface includes a plurality of user input devices coupled to the microcontroller and adapted to provide signaling to the microcontroller based upon a user's engagement therewith, the plurality of user input devices adapted to allow the user to create a plurality of irrigation schedules; and a user display coupled to the microcontroller and adapted to display irrigation parameters associated with the plurality of irrigation schedules. The microcontroller is adapted to cause the user display to display system variables associated with multiple irrigation schedules together to the user.

Another embodiment exemplarily described herein relates to an irrigation controller that includes a housing; a microcontroller within the housing and adapted to store and execute an irrigation schedule; a valve driver coupled to the microcontroller and adapted to output a zone activation signal to an actuatable zone valve in response to signaling from the microcontroller; and a user interface. The user interface includes a plurality of user input devices coupled to the microcontroller and adapted to provide signaling to the microcontroller based upon a user's engagement therewith, the plurality of user input devices adapted to allow the user to create an irrigation schedule; and a user display coupled to the microcontroller and adapted to display irrigation parameters associated with the irrigation schedule. The microcontroller is adapted to cause the user display to display system variables associated with a plurality of upcoming irrigation events together to the user.

Another embodiment exemplarily described herein relates to an irrigation controller that includes a housing; a microcontroller within the housing and adapted to modify an existing irrigation schedule and execute the modified irrigation schedule; a valve driver coupled to the microcontroller and adapted to output a zone activation signal to an actuatable zone valve in response to signaling from the microcontroller; and a user interface. The user interface includes a plurality of user input devices coupled to the microcontroller and adapted to provide signaling to the microcontroller based upon a user's engagement therewith; and a user display coupled to the microcontroller and adapted to display an irrigation parameter associated with an irrigation schedule. The microcontroller is adapted to cause the user display to display a variable irrigation duration adjustment schedule associated with the existing irrigation schedule.

Another embodiment exemplarily described herein relates to an irrigation controller that includes a housing; a microcontroller within the housing and adapted to store and execute an irrigation schedule, wherein execution of the irrigation schedule is suspendable for an adjustable period of time; a zone driver coupled to the microcontroller and adapted to output a zone activation signal to an actuatable zone valve in response to signaling from the microcontroller; and a user interface. The user interface includes a plurality of user input devices coupled to the microcontroller and adapted to provide signaling to the microcontroller based upon a user's engagement therewith; and a user display coupled to the microcontroller and adapted to display irrigation parameters associated with the irrigation schedule. In the event execution of the irrigation schedule is suspended for the adjustable period of time, the microcontroller is adapted to cause the user display to display an indication of an amount of time remaining until the suspension is removed.

Another embodiment exemplarily described herein relates to an irrigation controller that includes a housing; a microcontroller within the housing and adapted to store and execute an irrigation schedule, wherein the irrigation schedule is subject to a water use restriction limiting one or more of an irrigation start day and an irrigation start time; a valve driver coupled to the microcontroller and adapted to output a zone activation signal to an actuatable zone valve in response to signaling from the microcontroller; and a user interface. The user interface includes a plurality of user input devices coupled to the microcontroller and adapted to provide signaling to the microcontroller based upon a user's engagement therewith, the plurality of user input devices adapted to allow the user to create an irrigation schedule; and a user display coupled to the microcontroller and adapted to display irrigation parameters associated with the irrigation schedule. The microcontroller is adapted to cause the user display to display the water use restriction to the user.

Another embodiment exemplarily described herein relates to an irrigation controller that includes a housing; a microcontroller within the housing and adapted to store and execute an irrigation schedule, wherein the irrigation schedule is subjectable to a water use restriction limiting one or more of an irrigation start day and irrigation start time; a valve driver coupled to the microcontroller and adapted to output a zone activation signal to an actuatable zone valve in response to signaling from the microcontroller; and a user interface. The user interface includes a plurality of user input devices coupled to the microcontroller and adapted to provide signaling to the microcontroller based upon a user's engagement therewith, the plurality of user input devices adapted to allow the programming of a water use restriction; and a user display coupled to the microcontroller and adapted to display system variables associated with the water use restriction. The microcontroller is adapted to cause the user display to display the water use restriction.

Another embodiment exemplarily described herein relates to an irrigation controller that includes a housing; a microcontroller within the housing and adapted to store and execute an irrigation schedule; a valve driver coupled to the microcontroller and adapted to output a zone activation signal to an actuatable zone valve in response to signaling from the microcontroller; and a user interface. The user interface includes a dedicated language adjustment input coupled to the microcontroller and adapted to provide signaling to the microcontroller based upon a user's engagement therewith; and a user display coupled to the microcontroller and adapted to display irrigation parameters associated with the irrigation schedule, the user display comprising a display screen. The microcontroller is adapted to cause the user display to display information to the user in different languages based upon the user's engagement with the dedicated language adjustment input.

Another embodiment exemplarily described herein relates to an irrigation controller that includes a housing; a microcontroller within the housing and adapted to store system variables and execute an irrigation schedule based upon values of at least a portion of the system variables; a valve driver coupled to the microcontroller and adapted to output a zone activation signal to an actuatable zone valve in response to signaling from the microcontroller; and a user interface. The user interface includes a plurality of user input devices coupled to the microcontroller and adapted to provide signaling to the microcontroller based upon a user's engagement therewith, the plurality of user input devices adapted to allow the user to view the system variables; and a user display coupled to the microcontroller and adapted to display values of at least a portion of the system variables, the user display comprising a color display screen. The microcontroller is adapted to cause the user display to display different system variables in different colors.

Another embodiment exemplarily described herein relates to an irrigation controller that includes a housing; a microcontroller within the housing and adapted to store system variables and execute an irrigation schedule based upon values of at least a portion of the system variables; a valve driver coupled to the microcontroller and adapted to output a zone activation signal to an actuatable zone valve in response to signaling from the microcontroller; and a user interface. The user interface includes a plurality of user input devices coupled to the microcontroller and adapted to provide signaling to the microcontroller based upon a user's engagement therewith, the plurality of user input devices adapted to allow the user to view the system variables; and a user display coupled to the microcontroller and adapted to display values of at least a portion of the system variables, the user display comprising a color display screen. The microcontroller is adapted to cause the user display to display different values of a system variable in different colors.

Another embodiment exemplarily described herein relates to an irrigation controller that includes a housing; a microcontroller within the housing and adapted to store system variables and execute irrigation schedules based upon values of at least a portion of the system variables; a plurality of valve drivers coupled to the microcontroller, each adapted to output a zone activation signal to an actuatable zone valve in response to signaling from the microcontroller; and a user interface. The user interface includes a plurality of user input devices coupled to the microcontroller and adapted to provide signaling to the microcontroller based upon a user's engagement therewith, the plurality of user input devices adapted to allow the user to view the system variables; and a user display coupled to the microcontroller and adapted to display values of at least a portion of the system variables, the user display comprising a color display screen. The microcontroller is adapted to cause the user display to display system variables associated with different irrigation schedules or different irrigation programs in different colors.

Another embodiment exemplarily described herein relates to an irrigation controller that includes a housing; a microcontroller within the housing and adapted to store system variables and execute irrigation programs based upon values of at least a portion of the system variables; a valve driver coupled to the microcontroller and adapted to output a zone activation signal to an actuatable zone valve in response to signaling from the microcontroller; and a user interface. The user interface includes a plurality of user input devices coupled to the microcontroller and adapted to provide signaling to the microcontroller based upon a user's engagement therewith, the plurality of user input devices adapted to allow the user to view the system variables; and a user display coupled to the microcontroller and adapted to display values of at least a portion of the system variables, the user display comprising a color display screen. The microcontroller is adapted to cause the user display to display system variables associated with different irrigation programs in different colors.

Another embodiment exemplarily described herein relates to an irrigation controller that includes a housing; a microcontroller within the housing and adapted to store and execute an irrigation schedule; a valve driver coupled to the microcontroller and adapted to output a zone activation signal to an actuatable zone valve in response to signaling from the microcontroller; and a user interface. The user interface includes a display screen coupled to the microcontroller and adapted to display irrigation parameters associated with the irrigation schedule; and a plurality of non-labeled user input devices proximate to the display screen coupled to the microcontroller and adapted to provide signaling to the microcontroller based upon a user's engagement therewith, the plurality of user input devices adapted to allow the user to create at least in part an irrigation schedule. The the microcontroller is adapted to cause information to be displayed upon the display screen, wherein signaling by each of the plurality of non-labeled user devices corresponds to information displayed upon the display screen at a location proximate to a corresponding non-labeled user input device.

Another embodiment exemplarily described herein relates to an irrigation controller that includes a housing; a microcontroller within the housing and adapted to store a password; a valve driver coupled to the microcontroller and adapted to output a zone activation signal to an actuatable zone valve in response to signaling from the microcontroller; and a user interface. The user interface includes a plurality of user input devices coupled to the microcontroller and adapted to provide signaling to the microcontroller based upon a user's engagement therewith, the plurality of user input devices adapted to allow entry of the password to unlock password protected functionality of the controller. The microcontroller is adapted to cause the user display to display system variables associated with the password.

BRIEF DESCRIPTION OF THE DRAWINGS

The above and other aspects, features and advantages of the several embodiments exemplarily described herein will be more apparent from the following more particular description thereof, presented in conjunction with the following drawings.

Figure 1A:
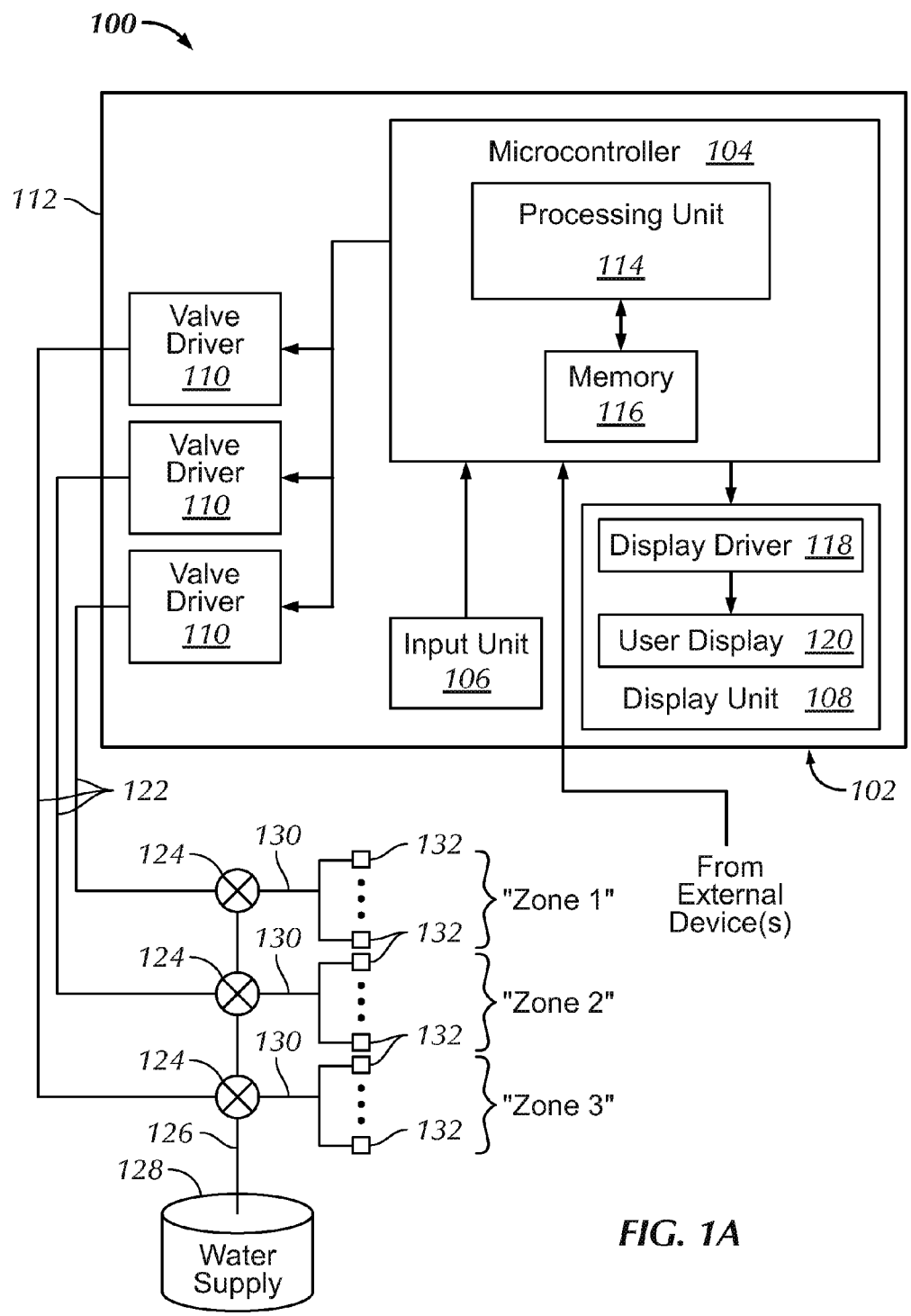
FIG. 1A illustrates a block diagram of an irrigation system including an irrigation controller that controls watering of several irrigation zones in accordance with several embodiments described herein.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments exemplarily described herein. Also, common but well-understood elements that are useful or necessary in a commercially feasible embodiment are often not depicted in order to facilitate a less obstructed view of the variously described embodiments.

DETAILED DESCRIPTION

The following description is not to be taken in a limiting sense, but is made merely for the purpose of describing the general principles of exemplary embodiments described herein. The scope of the invention should be determined with reference to the claims.

Referring first to FIG. 1A, an exemplary irrigation system 100 is shown as including a zone-based programmable irrigation controller 102 (also referred to simply as an "irrigation controller"), a microcontroller 104, an input unit 106, a display unit 108, a plurality of valve drivers 110, a housing 112, a processing unit 114, a memory 116, a display driver 118, a user display 120, a plurality of actuation lines 122, a plurality of zone valves 124, a main irrigation line 126, a water supply 128, a plurality of branch irrigation lines 130, and a plurality of irrigation devices 132.

As generally illustrated, the irrigation controller 102 is typically provided as a specific purpose computing device located within an irrigation area. Such an irrigation controller 102 comprises the microcontroller 104, the input unit 106, the display unit 108, and the plurality of valve drivers 110, all of which are disposed within the housing 112. The processing unit 114 and the memory 116 are all part of the microcontroller 104. The display driver 118 and user display 120 comprise the display unit 108.

The processing unit 114 is coupled to the memory 116. The display unit 108 is coupled to the microcontroller 104. As exemplarily illustrated, the display driver 118 is coupled to the user display 120. It will be appreciated, however, that the display driver 118 (or portion thereof) may be a part of the microcontroller 104 (e.g., a part of the processing unit 114). The input unit 106 is coupled to the microcontroller 104. Each of the plurality of valve drivers 110 is coupled to the microcontroller 104. Moreover, each valve driver 110 is coupled to an actuation line 122 that is, in turn, coupled to a zone valve 124. Each zone valve 124 is coupled between the main irrigation line 126 (with which the main water supply 128 is in fluid communication). A plurality of branch irrigation lines 130 are coupled to each zone valve 124. Irrigation devices 132 are coupled to (e.g., in fluid communication with) a plurality of branch irrigation lines 130. When organized into groups within a particular irrigation area (e.g., a residential landscape), irrigation devices 132 coupled to a particular zone valve 124 via respective branch irrigation lines 130 define an "irrigation zone" (also referred to simply as a "zone") within the particular irrigation area.

For example, as shown in FIG. 1A, groups of irrigation devices 132 coupled to a first zone valve 124 can be organized to define a first zone (i.e., "ZONE 1"), groups of irrigation devices 132 coupled to a second zone valve 124 can be organized to define a second zone (i.e., "ZONE 2"), and so on. The irrigation controller 102 described above with respect to FIG. 1A is often referred to as an "embedded" irrigation controller or a "stand-alone" irrigation controller, as opposed to a controller system supported by a general purpose computing device such as a personal computer that is adapted to control multiple embedded controllers.

The main and branch irrigation lines 126 and 130 can be provided as any suitable pipe, the irrigation devices 132 can be provided as any suitable sprinkler, dripline, or the like, or combinations thereof. The zone valves 124 can be provided as any suitable electronically or mechanically actuatable device (e.g., a solenoid controlled valve) that controls the flow of fluids therethrough to the branch irrigation lines 130 in response to signals output by the irrigation controller 102 and transmitted via the actuation lines 122. In one embodiment, the actuation lines 122 are wireline connections. In another embodiment, the actuation lines 122 are wireless communication links. When a particular zone valve 124 is actuated, water from the water supply 128 flows through the actuated zone valve 124 and branch irrigation lines 130 coupled to the actuated zone valve 124, and is dispensed by the irrigation devices 132 spatially located within a region of the irrigation area defining the zone.

According to numerous embodiments, a user of the irrigation controller 102 may create, modify, and execute an irrigation schedule associated with one or more zones. As used herein, the term "irrigation schedule" refers to the set of irrigation parameters including, for example, irrigation start days, irrigation start times, irrigation durations, and number of irrigation starts per irrigation start day (i.e., irrigation frequency). In one embodiment, the irrigation controller 102 executes irrigation schedules by generating valve actuation signals and transmitting the valve actuation signals to one or more zone valves 124 via one or more actuation lines 122. Zone valves respond to the transmitted valve actuation signals by selectively placing the main irrigation line 126 and branch irrigation lines 130 coupled thereto into, and out of fluid communication.

Having generally described the irrigation system 100 exemplarily illustrated in FIG. 1A, a more detailed discussion of the irrigation controller 102 will now be provided.

According to several embodiments, the input unit 106 comprises a user interface (not shown) adapted to be engaged by a user, thereby enabling the user to create, view, and modify irrigation schedules associated with one or more zones. The user interface is further adapted to generate signals containing input information that corresponds to the user's engagement with the user interface. Although the input unit 106 is illustrated as being disposed within the housing 112, it will be appreciated that the input unit may additionally or alternatively be remotely situated outside the housing 112 and coupled to the microcontroller 104 via any suitable wired or wireless means.

Input information is transmitted from the input unit 106 to the microcontroller 104. In some embodiments, information describing environmental conditions surrounding the plurality of zones (i.e., environmental information) is transmitted from one or more external devices (e.g., rain detectors, soil moisture detectors, thermometers, remote weather servers, etc.) is also transmitted to the microcontroller 104. In some embodiments, the environmental information may be input by the user via, for example, the user interface. Information received at the microcontroller 104 is transmitted to the processing unit 114 via any suitable means.

According to several embodiments, the processing unit 114 comprises circuitry adapted to implement a plurality of functionalities that, as will be described in greater detail below, allow a user of the irrigation controller 102 to create, view, and modify an irrigation schedule associated with one or more zones.

In one general embodiment, the processing unit 114 generates one or more zone driving signals based, at least in part, upon input information received via the bus 124. Zone driving signals are transmitted from the processing unit 114 to a valve driver 110 via any suitable means. Each valve driver 110 is adapted to generate a valve actuation signal upon receiving a zone driving signal. As described above, valve actuation signals are transmitted from a valve driver 110 to a corresponding zone valve 124 via an actuation line 122 to cause irrigation to occur within one or more zones.

In another general embodiment, the processing unit 114 generates one or more display driving signals based, at least in part, upon input information and/or environmental received via the bus 124. Display driving signals are transmitted from the processing unit 114 to the display driver 118 via any suitable means. The display driver 118 is adapted to generate user display driving signals upon receiving display driving signals. User display driving signals are subsequently transmitted to the user display 120. The user display 120 responds to the user display driving signals by displaying information to the user that allows the user to create, view, and modify an irrigation schedule associated with one or more zones.

The user display 120 may be provided as one or more of a display screen (e.g., a dot matrix-type liquid crystal display (LCD) (color or black/white), a segment-type LCD (color or black/white), a cathode ray tube (CRT) (color or black/white), a plasma display panel (PDP) (color or black/white)), one or more illuminatable devices (e.g., light emitting diodes (LEDs)) of one or more colors, or similar display devices, or combinations thereof. Additionally, the user display 120 may comprise a plurality of labels arranged, for example, on the housing 112. Although FIG. 1A illustrates the display driver 118 as a single component, it will be appreciated that the display driver 118 may comprise a plurality of components corresponding in number and type to the display devices comprised as part of the user display 120. Additionally, one or more portions of the display driver 118 may be implemented within the processing unit 114.

The memory 116 stores values for system variables that enable a user to create, view, and modify an irrigation schedule associated with one or more zones. Examples of system variables include current hour-of-day and current minute-of-hour (collectively referred to as "current time-of-day"); current year, current month-of-year, and current day-of-month (collectively referred to as "current date"); selected zone; irrigation start day; irrigation start time; irrigation frequency; irrigation duration; rain delay information; manual irrigation duration adjust; and the like. In additional features according to several embodiments, other system variables include high-irrigation duration adjust; low-irrigation duration adjust; high-month adjust; block-out start time; block-out stop time; restricted use day; display panel language; and the like. In some embodiments, the memory 116 also stores values of environmental information that enable a user to display environmental conditions surrounding the zones associated with the irrigation controller 102 as system variables such as wind speed, air temperature, soil moisture, humidity, plant hydration, solar radiation, soil heat flux, air pressure, soil temperature, wind direction, etc. Accordingly, the processing unit 114 may generate the aforementioned zone driving signals and display driving signals by accessing values of system variables and environmental information stored within the memory 116. In one embodiment, the memory 116 may be provided as a read-only-memory ROM, random-access-memory (RAM), electrically erasable programmable read only memory (EEPROM), magnetic/optical disk drive, or the like, or combinations thereof.

Figure 1B:
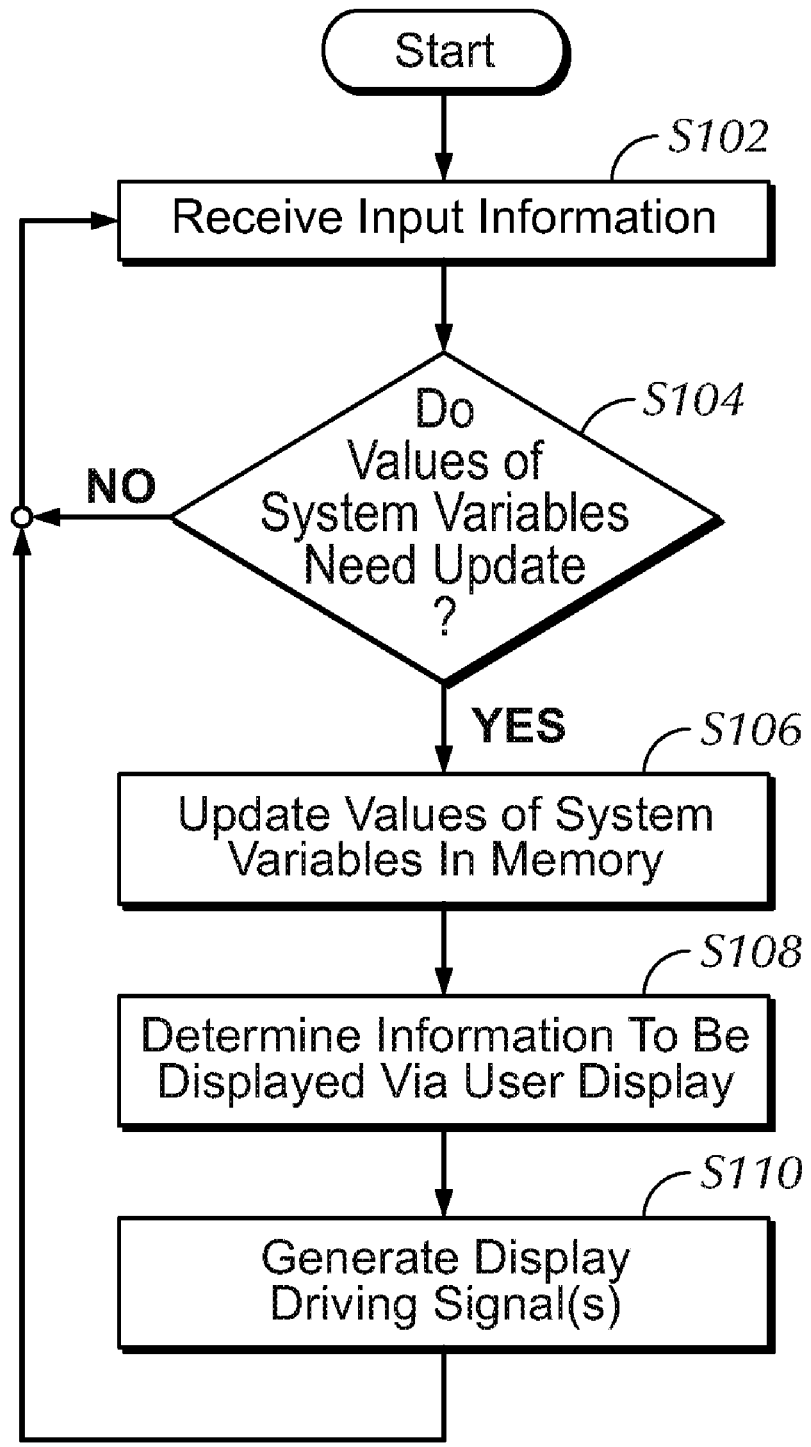
FIG. 1B illustrates an exemplary process by which a user display of the irrigation controller shown in FIG. 1A is driven.

An exemplary process by which display driving signals are generated by the display driving circuitry will now be described with respect to FIG. 1B.

As shown at S102, the processing unit 114 receives information (e.g., from the input unit 106, the memory 116, external devices, etc.) and executes instructions stored within memory 116 in response to the information received.

At S104, the processing unit 114 determines whether values of any system variables associated with one or more zones need to be updated within the memory 116. In one embodiment, the processing unit 114 makes this determination by comparing an existing value of a particular system variable stored in memory 116 with the value of the particular system variable as contained in the input information. If it is determined that no value of any system variable needs to be updated, then the processing unit 114 waits to receive additional input information from the input unit 106.

If it is determined that one or more values for one or more system variables need to be updated, then at S106, the processing unit 114 identifies those system variables having one or more variables that need to be updated and updates such values of the identified system variables within the memory 116.

At S108, the display circuitry determines the information that should be displayed via the user display 120. In one embodiment, the display circuitry determines what information to display by accessing existing values of system variables stored in memory 116.

At S110, the display circuitry generates one or more display driving signals based on the determination made at S108.

Having discussed the irrigation controller 102 with respect to FIGS. 1A and 1B above, a more detailed discussion of one embodiment of an exemplary user interface of the input unit 106 will now be described in greater detail with respect to FIG. 2.

As described above, the input unit 106 includes a user interface adapted to be engaged by a user, thereby enabling the user to create, view, and modify an irrigation schedule associated with one or more zones. As exemplarily shown in FIG. 2, the user interface 200 includes a rotary dial 202, a plurality of functionality labels 204 marking a plurality of selectable positions of the rotary dial 202, a dot-matrix type LCD 206 (herein referred to as the "display panel 206"), first and second multi-function adjustment button groups 208a and 208b (each containing first and second multi-function adjustment buttons 210a and 210b), first and second system variable indicators 212a and 212b, an irrigation frequency adjustment button group 214 (containing first and second irrigation frequency adjustment buttons 216a and 216b), a plurality of irrigation frequency indicators 218 (e.g., LEDs), a plurality of irrigation frequency labels 220, an irrigation start day adjustment button group 222 (containing first and second irrigation start day adjustment buttons 224a and 224b), a plurality of irrigation start day indicators 226 (e.g., LEDs), a plurality of irrigation start day labels 228, a manual start button 230, a manual duration adjust indicator 232 (e.g., an LED), and a language adjust button 234.

In the illustrated embodiment, the rotary dial 202, the first and second multi-function adjustment button groups 208a and 208b, the irrigation frequency adjustment button group 214, the irrigation start day adjustment button group 222, the manual start button 230, and the language adjust button 234 may all be engaged by a user. This allows the user to adjust values of the aforementioned system variables to create, view, or modify an irrigation schedule associated with one or more zones. Therefore, these elements may be generally characterized as "user input devices." According to numerous embodiments, the user input devices are coupled to the aforementioned input circuitry. Therefore, input information transmitted from the input unit 106 may include adjusted values of the aforementioned system variables.

In the illustrated embodiment, the display panel 206, the plurality of irrigation frequency indicators 218, the plurality of irrigation start day indicators 226, and the manual duration adjust indicator 232 are part of the user display 120. Accordingly, these elements are driven by the display driver 118 to present information to the user. This allows the user to intelligently engage the user input devices to adjust values of the aforementioned system variables while creating, viewing, or modifying an irrigation schedule associated with one or more zones. In one embodiment, the display panel 206 is capable of displaying information (e.g., text, numbers, etc.) in one or more languages.

The rotary dial 202 may be engaged by a user to be positioned at a location aligned with a functionality label 204. Once aligned with a particular label, the rotary dial 202 causes the processing unit 114 to implement a predetermined functionality. As illustrated in FIG. 2, an exemplary group of functionalities implementable by the processing unit 114 include: off functionality (e.g., illustrated by the label "OFF"), auto run functionality (e.g., illustrated by the label "AUTO RUN"), clock setting functionality (e.g., illustrated by the label "SET CLOCK"), date setting functionality (e.g., illustrated by the label "SET DATE"), zone-specific irrigation schedule adjustment functionality associated with predefined zones (e.g., illustrated by the labels "ZONE 1", "ZONE 2", ... and "ZONE 6"), system-wide manual irrigation duration adjustment functionality (e.g., illustrated by the label "SEASON ADJUST"), and system wide irrigation start time suspension functionality (e.g., illustrated by the label "RAIN DELAY"). In other embodiments, the processing unit 114 is adapted to implement system-wide automatic irrigation duration adjustment functionality and system-wide water use restrict functionality.

In one embodiment, when the rotary dial 202 has been positioned in alignment with a particular functionality label 204 (i.e., when a particular functionality has been selected by the user), values of system variables associated with the selected functionality are displayed and may be adjusted by a user's further engagement with user input devices incorporated within the user interface 200.

The first and second multi-function adjustment button groups 208a and 208b each contain first and second multi-function adjustment buttons 210a and 210b which may be engaged (e.g., pressed) by a user to adjust values of system variables associated with the functionality selected by the user via the rotary dial 202. In one embodiment, values of system variables that may be adjusted using the first multi-function adjustment button group 208a are different from values of system variables that may be adjusted using the second multi-function adjustment button group 208b. According to numerous embodiments, the first and second multi-function adjustment buttons 210a and 210b are not labeled. Accordingly, the display panel 206 may be driven to display labels (and values) of system variables that can be adjusted via the first multi-function adjustment button group 208a at a location near the first system variable indicator 212a. Similarly, the display panel 206 can be driven to display labels (and values) of system variables that can be adjusted via the second multi-function adjustment button group 208b at a location near the second system variable indicator 212b.

The irrigation frequency adjustment button group 214 contains first and second irrigation frequency adjustment buttons 216a and 216b which may be engaged (e.g., pressed) by a user to adjust the value of the irrigation frequency of an irrigation schedule associated with a particularly selected zone-specific irrigation schedule adjustment functionality. Each irrigation frequency indicator 218 is pre-associated with a value of the irrigation frequency. Each irrigation frequency label 220 is arranged adjacent to a particular irrigation frequency indicator 218 to intuitively identify the irrigation frequency value that is pre-associated with the particular irrigation frequency indicator 218. Each irrigation frequency indicator 218 may be driven as described above to become illuminated when the value of the irrigation frequency as adjusted by the user's engagement with the irrigation frequency adjustment button group 214 matches the pre-associated irrigation frequency value. It will be appreciated, however, that irrigation frequency indicators 218 may be driven to become illuminated by any suitable means other than those based upon display driving signals initially generated by the processing unit 114. For example, irrigation frequency indicators 218 may be driven to become illuminated simply upon the user's engagement with the irrigation frequency adjustment button group 214. In this embodiment, the microcontroller 104 monitors the indicators 218 to determine which one is illuminated.

Figure 2:
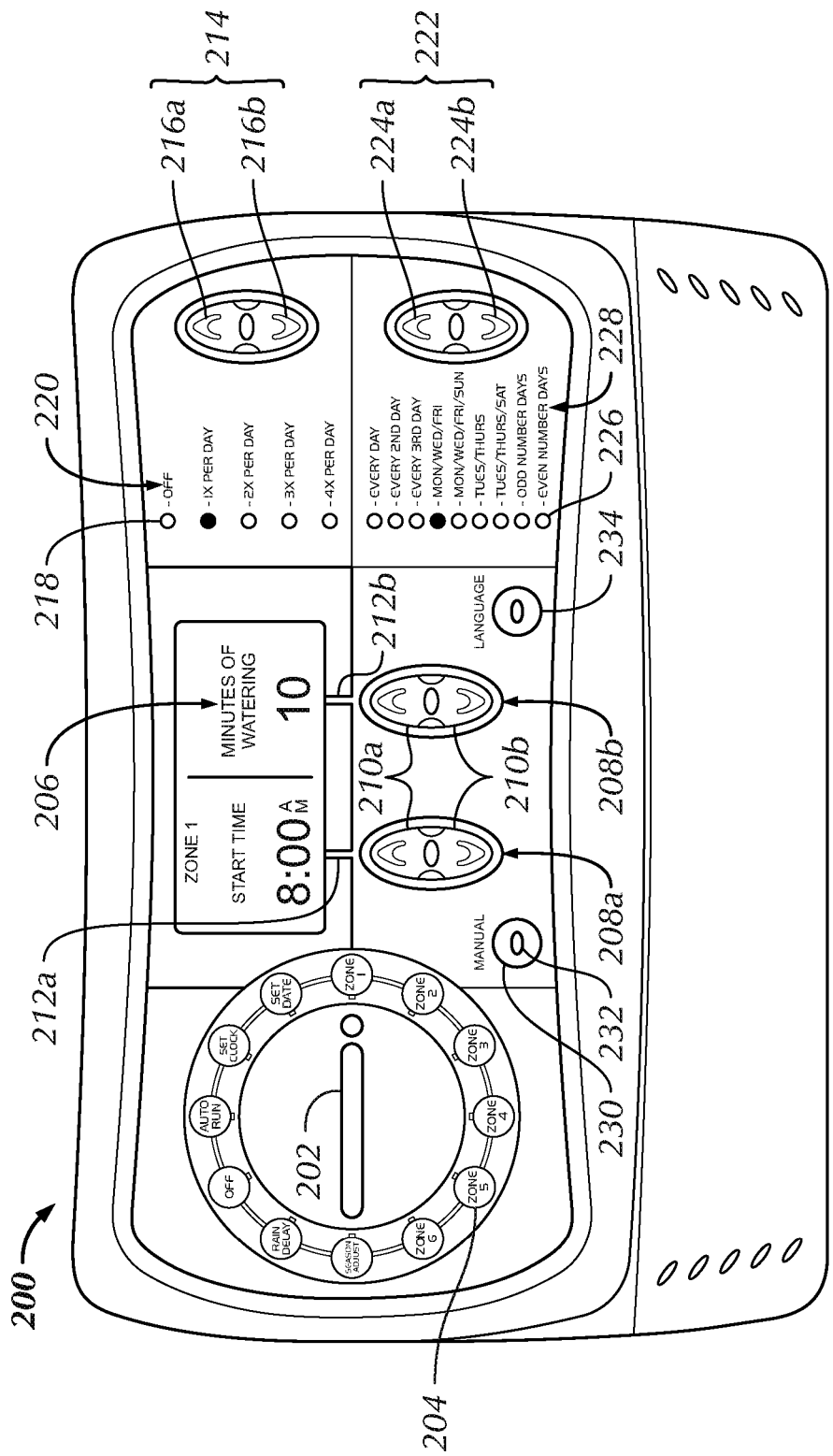
FIG. 2 illustrates one embodiment of a user interface of an irrigation controller.

As illustrated in FIG. 2, pre-associated irrigation frequency values include zero times per irrigation start day (e.g., as identified by the irrigation frequency label 220 "OFF"), once per irrigation start day (e.g., as identified by the irrigation frequency label 220 "1×PER DAY"), twice per irrigation start day (e.g., as identified by the irrigation frequency label 220 "2×PER DAY"), three times per irrigation start day (e.g., as identified by the irrigation frequency label 220 "3×PER DAY"), and four times per irrigation start day (e.g., as identified by the irrigation frequency label 220 "4×PER DAY").

The irrigation start day adjustment button group 222 contains first and second irrigation start day adjustment buttons 224a and 224b which may be engaged (e.g., pressed) by a user to adjust the value of the irrigation start day of an irrigation schedule associated with a particularly selected zone-specific irrigation schedule adjustment functionality. Each irrigation start day indicator 226 is pre-associated with a value of the irrigation start day. Each irrigation start day label 228 is arranged adjacent to a particular irrigation start day indicator 226 to intuitively identify the irrigation start day(s) that is(are) pre-associated with the particular irrigation start day indicator 226. Each irrigation start day indicator 226 may be driven as described above to become illuminated when the value of the irrigation start day as adjusted by the user's engagement with the irrigation start day adjustment button group 222 matches the pre-associated irrigation start day value. It will be appreciated, however, that irrigation start day indicators 226 may be driven to become illuminated by any suitable means other than those based upon display driving signals initially generated by the processing unit 114. For example, irrigation start day indicators 226 may be driven to become illuminated simply upon the user's engagement with the irrigation start day adjustment button group 222. In this embodiment, the microcontroller 104 monitors the indicators 226 to determine which one is illuminated.

As illustrated in FIG. 2, pre-associated irrigation start day values include every day (e.g., as identified by the irrigation start day label 228 "EVERY DAY"), every other day (e.g., as identified by the irrigation start day label 228 "EVERY SEC DAY"), every third day (e.g., as identified by the irrigation start day label 228 "EVERY 3RD DAY"), every Monday, Wednesday, and Friday (e.g., as identified by the irrigation start day label 228 "MON/WED/FRI"), every Monday, Wednesday, Friday, and Sunday (e.g., as identified by the irrigation start day label 228 "MON/WED/FRI/SUN"), every Tuesday and Thursday (e.g., as identified by the irrigation start day label 228 "TUES/THURS"), every Tuesday, Thursday, and Saturday (e.g., as identified by the irrigation start day label 228 "TUES/THURS/SAT"), odd days of the week (e.g., as identified by the irrigation start day label 228 "ODD NUMBER DAYS"), and even days of the week (e.g., as identified by the irrigation start day label 228 "EVEN NUMBER DAYS").

As will be described in greater detail below, upon being engaged (e.g., pressed) by the user, the manual start button 230 allows the user to engage the first or second multi-function adjustment button group 208a or 208b to adjust the value of the irrigation duration of an existing irrigation schedule associated with a particularly selected zone-specific irrigation schedule adjustment functionality. In one embodiment, the manual duration adjust indicator 232 is driven to become illuminated after a user has selected a zone-specific irrigation schedule adjustment functionality and engaged the manual start button 230, in that order.

Upon being engaged (e.g., pressed) by the user, the language adjust button 234 allows the user to adjust the language in which information is displayed to the user (i.e., display panel language) via the display panel 206. In one embodiment, the language adjust button 234 is single function button and has no other purpose. In another embodiment, upon repeatedly engaging the language adjust button 234 (e.g., by pressing multiple times or by pressing for longer than a pre-determined amount of time) a user can adjust the language of information displayed by the display panel 206 multiple times to select from one of a plurality of languages stored within memory 116 (e.g., English→Spanish→French→German→Italian→Japanese, etc.). In another embodiment, the display panel 206 may display information in a default display panel language that corresponds to the predominant language of the user(s) of the irrigation controller 102.

Having generally described an exemplary embodiment of the user interface 200, a more detailed discussion of the aforementioned functionalities, in addition to other functionalities that may be implemented by the processing unit 114, and associated user displays will now be described in greater detail with respect to FIGS. 3-21.

Figure 3:
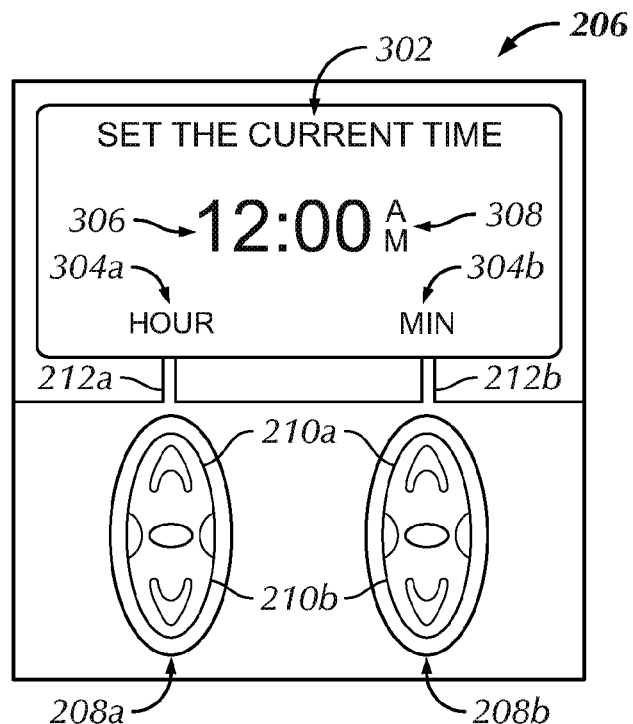
FIG. 3 illustrates one embodiment in which the user display shown in FIG. 2 is driven to present information upon a user's selection of a clock setting functionality via the user interface.

Clock Setting Functionality:

The clock setting functionality enables the user to set the current time-of-day upon which irrigation schedules is based. The clock setting functionality may be selected upon a user positioning the rotary dial 202 in alignment with the functionality label 204 "SET CLOCK". As shown in FIG. 3, when the clock setting functionality is selected, the display panel 206 is driven to display an intuitive functionality title 302 (e.g., "SET THE CURRENT TIME"), an hour-of-day label 304a (e.g., "HOUR"), a minute-of-hour label 304b (e.g., "MIN"), and existing values of system variables (including default values, if none have been previously adjusted by the user) such as the current hour-of-day 306 and current minute-of-hour 308.

Upon selecting the clock setting functionality, existing values of the current hour-of-day and current time-of-hour may be adjusted by the user's further engagement with the first and second multi-function adjustment button groups 208a and 208b, respectively. According to numerous embodiments, values which a particular multi-function adjustment button group can adjust when engaged by a user are defined based upon the proximity of intuitive labels and/or adjustable values to the particular multi-function adjustment button group. For example, the hour-of-day label 304a is displayed more proximate to the first multi-function adjustment button group 208a than to the second multi-function adjustment button group 208b while the minute-of-hour label 304b is displayed more proximate to the second multi-function adjustment button group 208b than to the first multi-function adjustment button group 208a. Accordingly, a user may engage the first and second multi-function adjustment buttons 210a and 210b of the first multi-function adjustment button group 208a to adjust an existing value of the hour-of-day to one of a plurality of predetermined hour-of-day values. Similarly, the user may engage the first and second multi-function adjustment buttons 210a and 210b of the second multi-function adjustment button group 208b to adjust an existing value of the minute-of-hour to one of a plurality of predetermined minute-of-hour values.

In another embodiment, existing values of the current hour-of-day and current time-of-hour may be adjusted by the user's further engagement with the first or second multi-function adjustment button groups 208a or 208b, respectively. In such an embodiment, the user may engage the first and second multi-function adjustment buttons 210a and 210b of the first or second multi-function adjustment button groups 208a or 208b to adjust an existing value of the hour-of-day combined with the minute-of-hour to one of a plurality of predetermined combined hour-of-day and minute-of-hour values. For example, upon a user's engagement with the first multi-function adjustment button 210a of the first multi-function adjustment button group 208a, the existing minute-of-hour value can be adjusted in increasing one minute increments until the existing minute-of-hour value is "59," after which a subsequent one minute increment results in an incremental adjustment in the hour-of-day value by one hour and the existing minute-of-hour value is adjusted to "0".

Generally, when either of the first or second multi-function adjustment buttons 210a or 210b in any of the first or second multi-function adjustment button groups 208a or 208b, is engaged by the user for a brief duration, the rate at which the display panel 206 is driven to change the display of values for system variables adjustable via a multi-function adjustment button group (e.g., hour-of-day, minute-of-hour, etc.) increases; that is, values of system variables (e.g., hour-of-day, minute-of-hour, etc.) displayed by the display panel 206 will change more rapidly.

Figure 4:
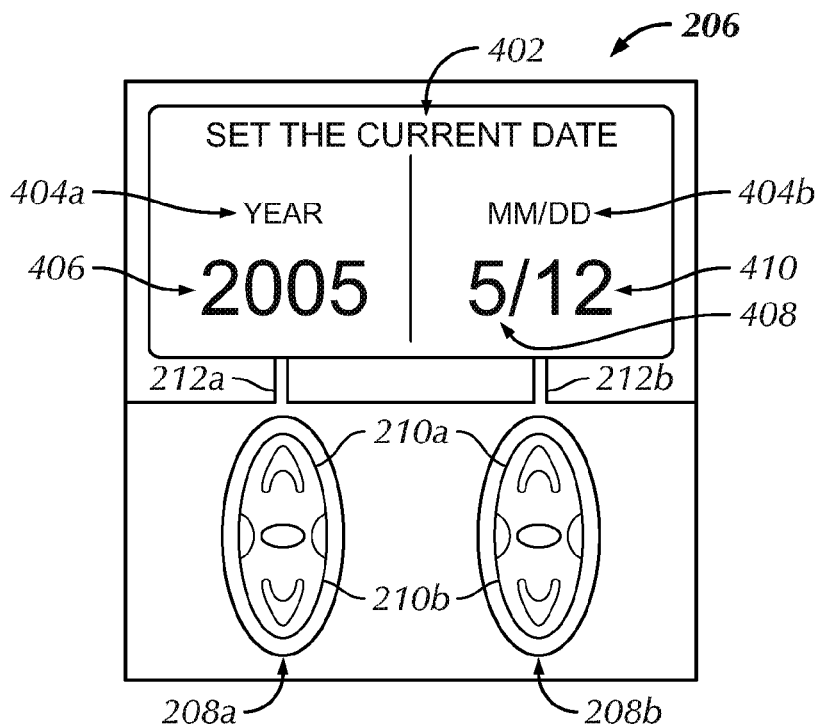
FIG. 4 illustrates one embodiment in which the user display shown in FIG. 2 is driven to present information upon a user's selection of a date setting functionality via the user interface.

Date Setting Functionality:

The date setting functionality enables the user to set the current date upon which creation, modification, and execution of irrigation schedules will be based. The date setting functionality may be selected upon a user positioning the rotary dial 202 in alignment with the functionality label 204 "SET DATE". As shown in FIG. 4, when the date setting functionality is selected, the display panel 206 is driven to display an intuitive functionality title 402 (e.g., "SET THE CURRENT DATE"), a current year label 402a (e.g., "YEAR"), a month/day 402b (e.g., "MM/DD"), and existing values of system variables (including default values, if none have been previously adjusted by the user) such as the current year 404, current month-of-year 406, and current day-of-month 408.

Upon selecting the date setting functionality, existing values of the current year, current month-of-year, and current day-of-month may be adjusted by the user's further engagement with the first and second multi-function adjustment button groups 208a and 208b, respectively. As similarly described above with respect to the clock setting functionality, values which a particular multi-function adjustment button group can adjust when engaged by a user are defined based upon the proximity of intuitive labels and/or adjustable values to the particular multi-function adjustment button group. For example, a user may engage the first and second multi-function adjustment buttons 210a and 210b of the first multi-function adjustment button group 208a to adjust an existing value of the current year to one of a plurality of predetermined current year values. A user may engage the first and second multi-function adjustment buttons 210a and 210b of the second multi-function adjustment button group 208b to adjust an existing value of the current month-of-year combined with an existing value of the current day-of-month to one of a plurality of predetermined combinations of current month-of-year and day-of-month values.

Zone-specific Irrigation Schedule Adjustment Functionality:

The zone-specific irrigation schedule adjustment functionality allows a user to create, view, and modify irrigation schedules for a particularly selected zone. The zone-specific irrigation schedule adjustment functionality for a particular zone may be selected upon a user positioning the rotary dial 202 in alignment with a functionality label 204 identifying a particular zone (e.g., "ZONE 1", "ZONE 2", . . . or "ZONE 6"). When the zone-specific irrigation schedule adjustment functionality is selected, a user may engage the irrigation frequency and start day adjustment button groups 214 and 222 to set, view, or adjust existing irrigation frequency and start day values. The user may further engage the first and second multi-function adjustment button groups 208a and 208b to set, view, or adjust existing irrigation start time and irrigation duration values. Accordingly, the display panel 206 is driven to display information based, at least in part, upon values of the irrigation frequency and irrigation start day as adjusted by the user via the irrigation frequency and start day adjustment button groups 214 and 222 as well as upon values of system variables adjustable via the first multi-function adjustment button group 208*a*.

For example, as shown in FIG. 2, a user has positioned the rotary dial 202 in alignment with the functionality label 204 identifying a zone-specific irrigation schedule adjustment functionality associated with predefined zone 1 (e.g., "ZONE 1"), has further engaged (e.g., pressed) the first or second irrigation frequency adjustment buttons 216*a* or 216*b* to adjust an existing irrigation frequency value until the irrigation frequency indicator 218 associated with the irrigation frequency of once per day is driven to become illuminated, and has further engaged (e.g., pressed) the first or second irrigation start day adjustment buttons 224*a* or 224*b* to adjust an existing irrigation start day value until the irrigation start day indicator 226 associated with the irrigation start day of every Monday, Wednesday, and Friday is driven to become illuminated. As a result, and as shown in greater detail in FIG. 5, the display panel 206 is driven to display the aforementioned intuitive functionality title 502 (e.g., "ZONE 1") in addition to an intuitive irrigation start time status label 504*a* (e.g., "START TIME"), an intuitive irrigation duration label 504*b* (e.g., "MINUTES OF WATERING"), and existing values of system variables such as the irrigation start time 508 and irrigation duration 510. In the illustrated embodiment, the irrigation start time status label 504*a* is displayed more proximate to the first multi-function adjustment button group 208*a* than to the second multi-function adjustment button group 208*b* while the irrigation duration label 504*b* is displayed more proximate to the second multi-function adjustment button group 208*b* than to the first multi-function adjustment button group 208*a*. As mentioned above, values which a particular multi-function adjustment button group can adjust when engaged by a user are defined based upon the proximity of intuitive labels and/or adjustable values to the particular multi-function adjustment button group. Accordingly, upon the user's further engagement with the first multi-function adjustment button group 208*a*, existing values of the irrigation start time 508 may be adjusted. Similarly, upon the user's further engagement with the second multi-function adjustment button group 208*b*, existing values of the irrigation duration 510 may be adjusted.

In one embodiment, the irrigation start time is a combination of hour-of-day and minute-of-hour values. Accordingly, a user may engage the first and second multi-function adjustment buttons 210*a* and 210*b* of the first multi-function adjustment button group 208*a* to adjust an existing value of the irrigation start time 508 to one of a plurality of predetermined combinations of hour-of-day and minute-of-hour values. A user may engage the first and second multi-function adjustment buttons 210*a* and 210*b*, respectively, of the second multi-function adjustment button group 208*b* to adjust an existing value of the irrigation duration 510 to one of a plurality of predetermined irrigation duration values.

Figure 5:
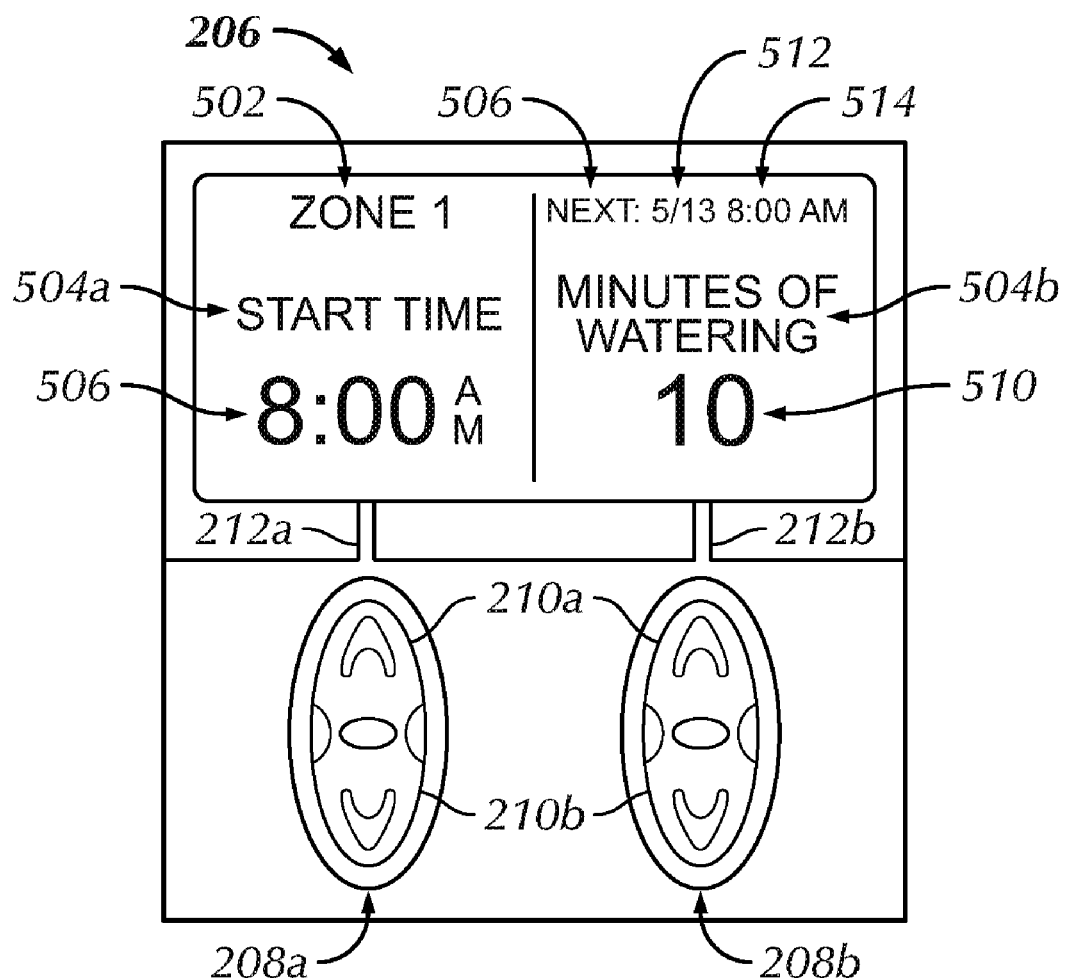
FIGS. 5 and 6 illustrate various embodiments in which the user display shown in FIG. 2 is driven to present information upon a user's selection of a zone-specific irrigation schedule adjustment functionality via the user interface.

Referring still to FIG. 5, in one embodiment, the display panel 206 may be driven to display an intuitive next irrigation day label 506 (e.g., "NEXT") in addition to an irrigation start day value 512, indicating the next day during which an irrigation schedule associated with zone 1 will be executed, and irrigation start time 514, indicating the time at which the irrigation schedule will be executed on the next irrigation start day. It will be appreciated that the irrigation start day value 512 will be based upon the value of the irrigation start time 508 as adjusted by the user via the first multi-function adjustment button group 208*a* while the irrigation start time value 514 will be based upon the value of the irrigation start day as adjusted by the user via the irrigation start day button group 222.

Figure 6:
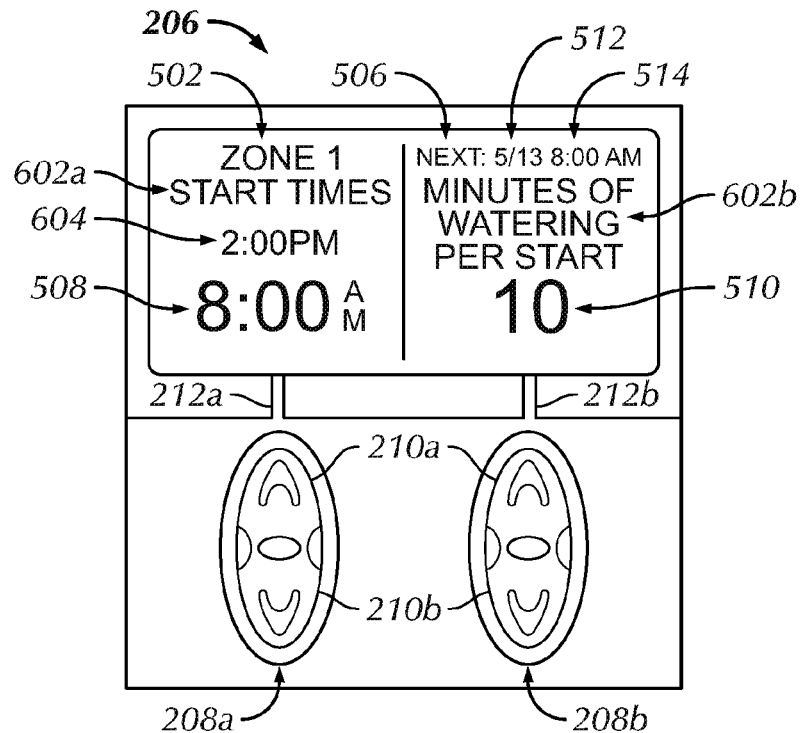

As shown in FIG. 6, with the rotary dial 202 still in alignment with the functionality label 204 identifying the zone-specific irrigation schedule adjustment functionality associated with predefined zone 1, the user has engaged (e.g., pressed) the first or second irrigation frequency adjustment buttons 216*a* or 216*b*, respectively, to adjust the existing irrigation frequency value until the irrigation frequency indicator 218 associated with the irrigation frequency of twice per day is driven to be illuminated. As a result, the display panel 206 is driven to display the aforementioned intuitive functionality title 502 (e.g., "ZONE 1") in addition to an intuitive irrigation start time status label 602*a* (e.g., "START TIMES"), an intuitive irrigation duration label 602*b* (e.g., "MINUTES OF WATERING PER START"), and existing values of system variables such as irrigation start times 508 and 604 and irrigation duration 510.

As discussed above with respect to FIG. 5, the existing value of the irrigation start time 508 may be adjusted upon the user's engagement with the first multi-function adjustment button group 208*a* while the existing value of the irrigation duration 510 may be adjusted upon the user's engagement with the second multi-function adjustment button group 208*b*. The number of irrigation start times displayed at 604 (and values associated therewith) corresponds to both the value of the irrigation frequency selected via the irrigation frequency button group 214 and the value of the irrigation start time 508 as adjusted by the user via the first multi-function adjustment button group 208*a*. For example, and as shown in FIG. 5, when an irrigation frequency value has been adjusted to twice per day, a single irrigation start time value of 6 hours after the irrigation start time value 508 is displayed at 604. When an irrigation frequency value has been adjusted to three times per day, two irrigation start time values of, for example, 4 and 8 hours after the irrigation start time value 508 are displayed at 604. When an irrigation frequency value has been adjusted to four times per day, three irrigation start time values of, for example, 3, 6, and 9 hours after the irrigation start time value 508 are displayed at 604. When an irrigation frequency value has been adjusted to zero times per day, the display panel 206 may simply be driven to intuitively indicate to the user that the selected zone is off.

By driving the various components of the user display 120 as described above, all irrigation parameters of an irrigation schedule that may be adjusted via the user interface and are associated with a particular zone are displayed to the user together. For example, in FIG. 2, a user can set, view, and adjust all of an irrigation start time, irrigation duration, irrigation frequency, and irrigation start day for a particular zone at once. In one embodiment, through the user's engagement with user input devices including at least one multi-function button, the user can set, view, and adjust all irrigation parameters (e.g., irrigation start time, irrigation duration, irrigation frequency, and irrigation start day, etc.) for a given zone, or alternatively for a given program. In another embodiment, through the user's engagement with user input devices including at least one rotary dial, the user can set, view, and adjust all irrigation parameters (e.g., irrigation start time, irrigation duration, irrigation frequency, and irrigation start day, etc.) for a given zone or, alternatively, for a given program. In a further embodiment, through the user's engagement with user input devices, all irrigation parameters (e.g., irrigation start time, irrigation duration, irrigation frequency, and irrigation start day, etc.) for a given zone or program are displayed on a user display including a display screen.

Figure 7:
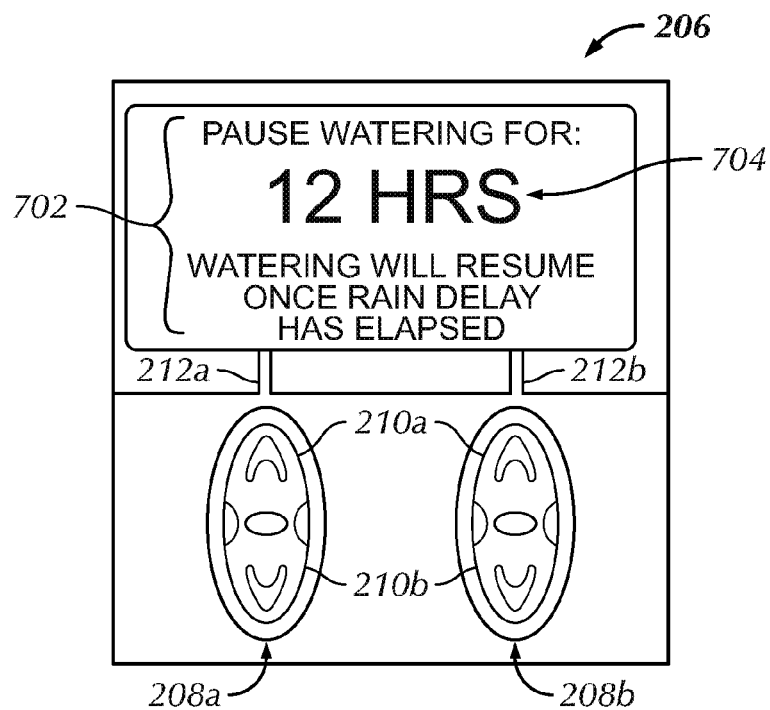
FIG. 7 illustrates one embodiment in which the user display shown in FIG. 2 is driven to present information upon a user's selection of an irrigation suspension functionality via the user interface.

System-wide Irrigation Start Time Suspension Functionality:

The system-wide irrigation start time suspension functionality enables the user to suspend the irrigation start times of irrigation schedules associated with all zones. The system-wide irrigation start time suspension functionality may be selected upon a user positioning the rotary dial 202 in alignment with the functionality label 204 "RAIN DELAY". As shown in FIG. 7, when the system-wide irrigation start time suspension functionality is selected, the display panel 206 is driven to display an intuitive functionality title 702 (e.g., "PAUSE WATERING FOR _____ HRS WATERING WILL RESUME ONCE RAIN DELAY HAS ELAPSED"), and a rain delay value 704 (i.e., a period of time during which existing irrigation start times are suspended).

Upon selecting the system-wide irrigation start time suspension functionality, an existing rain delay value may be adjusted by the user's further engagement with the first or second multi-function adjustment button groups 208a or 208b, respectively, thereby adjust the existing rain delay value to one of a plurality of predetermined rain delay values. As illustrated, a user has engaged the first or second multi-function adjustment button groups 208a or 208b, respectively, to adjust the rain delay value 704 to a predetermined rain delay value of 12 hours. Accordingly, irrigation schedules having irrigation start time values within a 12 hour window after the then-current time when the rain delay value 704 was adjusted will be suspended.

Figure 8:
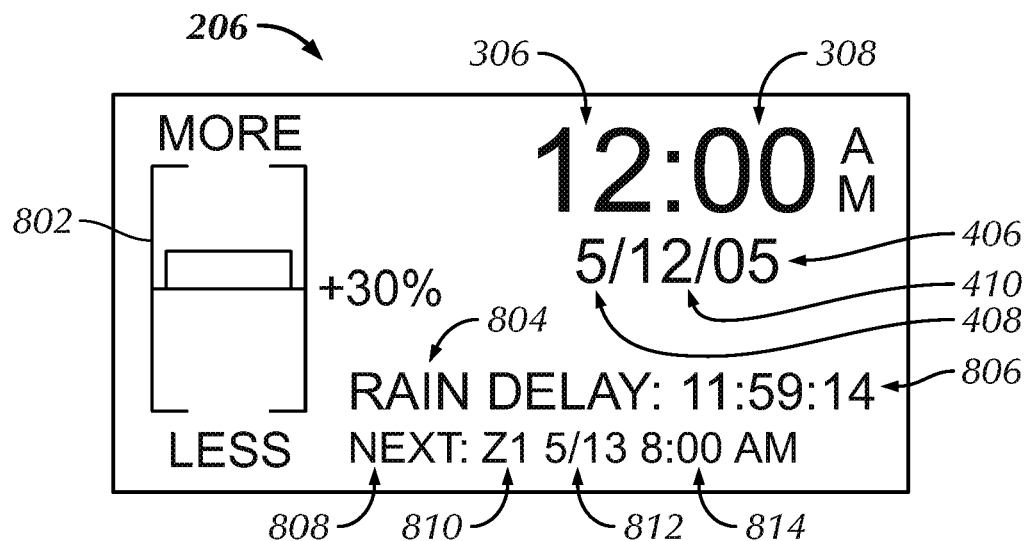
FIG. 8 illustrates one embodiment in which the user display shown in FIG. 2 is driven to present information upon a user's selection of an auto run functionality via the user interface.

Auto Run Functionality:

The auto run functionality enables the user to execute irrigation schedules of irrigation schedules associated with all zones. The auto run functionality may be selected upon a user positioning the rotary dial 202 in alignment with the functionality label 204 "AUTO RUN." As shown in FIG. 8, when the auto run functionality is selected, the display panel 206 can be driven to display values of the aforementioned current hour-of-day 306, current minute-of-hour 308, current year 406, current month-of-year 408, and current day-of-month 410.

In one embodiment, when the auto run functionality is selected, the display panel 206 can be driven to graphically and/or numerically display an amount by which an irrigation duration has been previously adjusted uniformly for all zones at 802. This type of adjustment is often referred to as a seasonal adjust and is selectable when the rotary dial 202 is positioned to align with the label SEASON ADJUST of FIG. 2.

In another embodiment, when the auto run functionality is selected, the display panel 206 can be driven to display an intuitive irrigation start time suspend title 804 (e.g., "RAIN DELAY") and a countdown-to-resume value 806 (e.g., provided in hours, minutes, and seconds) when an existing rain delay value has been adjusted to a positive value via the irrigation start times have been suspended via the system-wide irrigation start time suspension functionality. In one embodiment, the countdown-to-resume value 806 represents the amount of time remaining until the suspension of irrigation (or rain delay) will be lifted. This allows the user to know precisely when the suspension of regular irrigation schedules will be removed.

In another embodiment, when the auto run functionality is selected, the display panel 206 can be driven to display an intuitive next irrigation event title 808 (e.g., "NEXT"), a selected zone value 810, and a value of one of more upcoming irrigation events (e.g., an irrigation start day value 812, and an irrigation start time value 814). The selected zone value 810 identifies the zone having a particular irrigation schedule associated therewith that has both an irrigation start time and an irrigation start day that is closest to the current date and current time-of-day. Accordingly, the selected zone value 810 identifies the next zone for which an irrigation schedule will execute, and the irrigation start day and start time values 812 and 814, respectively, identify the irrigation start day and irrigation start time values, respectively, of the irrigation schedule associated with the next zone.

Figure 9:
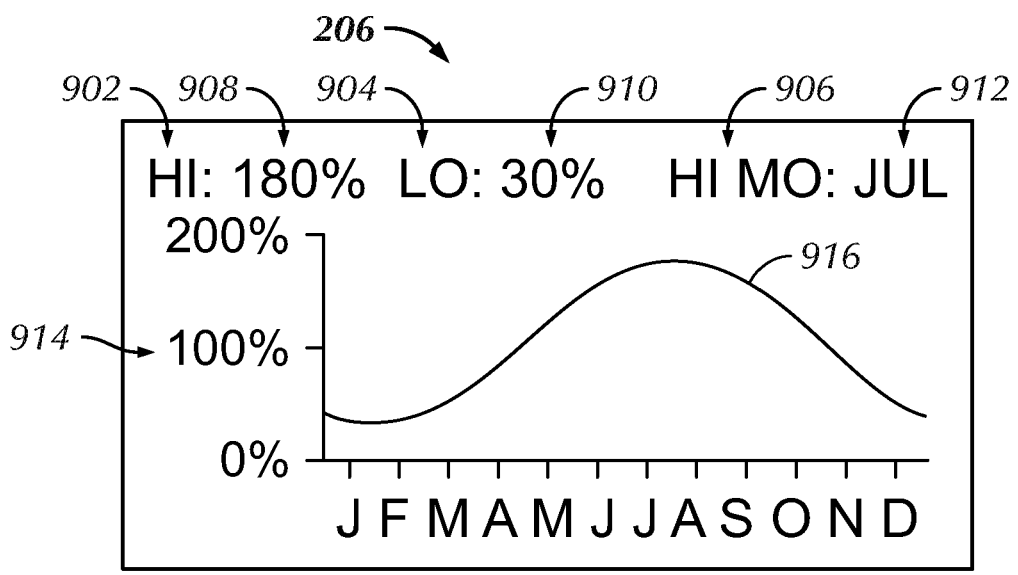
FIG. 9 illustrates one embodiment in which the user display shown in FIG. 2 is driven to present information upon a user's selection of an automatic irrigation duration adjustment functionality via the user interface.

System-wide Automatic Irrigation Duration Adjustment Functionality:

The system-wide automatic irrigation duration adjustment functionality enables the user to modify existing irrigation duration values of existing irrigation schedules associated with all zones by an adjustment amount that varies depending on, for example, the current month-of-year. The system-wide automatic irrigation duration adjustment functionality may be selected upon a user positioning the rotary dial 202 in alignment with an appropriate functionality label 204 (not shown). As shown in FIG. 9, when the system-wide automatic irrigation duration adjustment functionality is selected, the display panel 206 is driven to display a high-adjust label 902 ("HI:"), a low-adjust label 904 ("LO:"), a high-month label 906 ("HI MO:"), a high-irrigation duration adjust value 908, a low-irrigation duration adjust value 910, a high-month adjust value 912, a graph 914 of irrigation duration adjust values versus, for example, month-of-year, and a variable duration adjustment schedule 916.

Upon selecting the system-wide automatic irrigation duration adjustment functionality, a user may engage the first multi-function adjustment button group 208a to select between the high-irrigation duration adjust, the low-irrigation duration adjust, and the high-month adjust system variables and may further engage the second multi-function adjustment button group 208b to adjust existing values of the selected system variables to one of a plurality of predetermined values associated with each selected system variable.

Upon adjusting the existing high-duration value adjust value 908, low-duration value adjust value 910, and high-month adjust value 912, the display panel 206 is driven to display a variable duration adjustment schedule 916 upon the graph 914, wherein the variable duration adjustment schedule 916 corresponds to the selected values 908, 910, and 912. In one embodiment, the variable duration adjustment schedule 916 is a two-dimensional curve that represents the amount (e.g., the percentage) by which irrigation duration values of existing irrigation schedules associated with all zones will be automatically adjusted over time. The particular shape of the two-dimensional curve is determined by the microcontroller 104 based upon adjusted values of the high-duration value adjust, low-duration value adjust, and high-month adjust system variables. In one embodiment, the shape of the curve for the schedule 916 is a sinusoidal shape having a peak at the high-month adjust value and a low at an opposite time of year from the peak value. The microcontroller 104 automatically adjusts the irrigation duration values for watering throughout the year based on this curve without further input from the user. The user is able to adjust this curvature simply by adjusting the values 908, 910 and 912, and the microcontroller 104 automatically makes all adjustments to irrigation duration values of existing irrigation schedules. In one embodiment, the microcontroller 104 may adjust the irrigation duration of existing irrigation schedules by determining the current date, identifying value of the schedule 916 associated with the current date, and adjusting the irrigation duration of the existing irrigation schedules by the value identified from the schedule 916. Accordingly, in some embodiments, once the user inputs these values 908, 910 and 912, the user does not have to make further adjustments throughout the year to adjust the irrigation duration of irrigation schedules programmed into the irrigation controller 102.

Although the system-wide automatic irrigation duration adjustment functionality has been discussed herein with respect to the particularly described irrigation controller 102, it will be appreciated that the system-wide automatic irrigation duration adjustment functionality may be implemented by any suitable irrigation controller, embedded or otherwise, zone-based or otherwise.

Figure 10A:
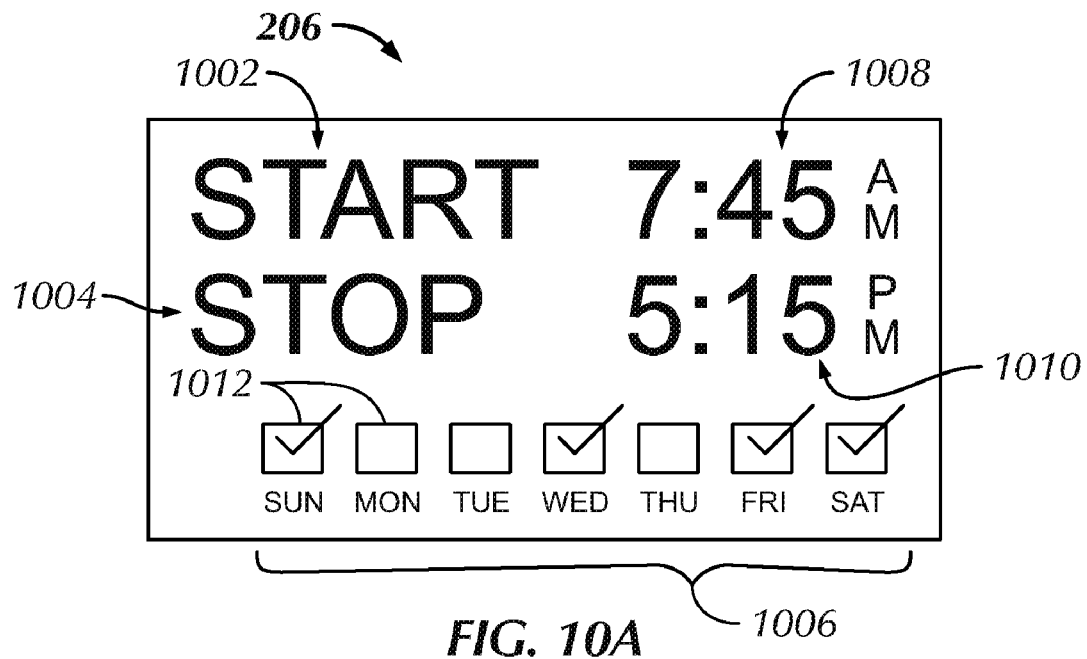
FIGS. 10A and 10B illustrate one embodiment in which the user display shown in FIG. 2 is driven to present information upon selection of a water use restrict functionality (not shown) via the user interface.
Figure 10B:
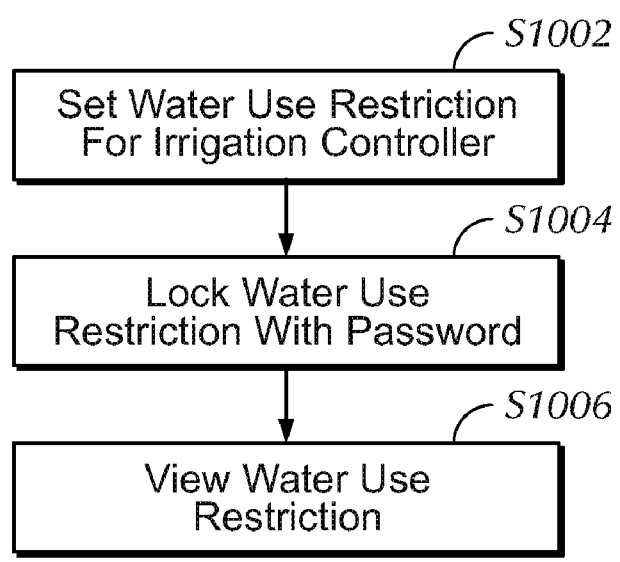

Water Use Restrict Functionality:

The water use restrict functionality enables water use restrictions to be imposed upon existing irrigation schedules associated with all zones. Accordingly, when a water use restriction is effective, water use is restricted (e.g., not permitted for use in irrigation). Exemplary water use restrictions may be defined by an intra-day block-out period during which existing irrigation schedules cannot be implemented and one or more restricted use days during which the intra-day block-out periods are effective. The display of water use restrictions may be selected upon a user positioning the rotary dial 202 in alignment with an appropriate functionality label 204 (not shown). As shown in FIG. 10A, when the water use restrict functionality is selected, the display panel 206 is driven to display an intra-day block-out start label 1002 (e.g., "START"), an intra-day block-out stop label 1004 (e.g., "STOP"), a plurality of restricted use day labels 1006 (e.g., identified as a plurality of boxes, wherein each box corresponds to a day of the week) in addition to values for system variables such as block-out start time 1008 and block-out stop time 1010. As shown, values for the restricted use day 1012 are binarily characterized by either the presence or absence of a check mark within boxes 1006.

Upon selecting the water use restrict functionality, a user may engage the first multi-function adjustment button group 208a to select between the block-out start time, the block-out stop time, and the restricted use day system variables and may further engage the second multi-function adjustment button group 208b to adjust existing values of the selected system variables to one of a plurality of predetermined values associated with each selected system variable. As illustrated, a user has engaged the first and second multi-function adjustment button groups 208a and 208b, respectively, to adjust the block-out start time 1008 to 7:45 AM, the block-out stop time 1010 to 5:15 PM, and the restricted use days to Sunday, Wednesday, Friday, and Saturday. Accordingly, the irrigation controller 102 will not execute irrigation schedules between 7:45 AM and 5:15 PM on Sunday, Wednesday, Friday, and Saturday.

In one embodiment, the irrigation controller 102 may be password locked by any suitable means (e.g., via some combination of letters and/or numbers). Accordingly, in order to enter initial values or adjust existing values of the block-out start or stop times or the restricted use day, the user must enter the correct password via, for example, the first and second multi-function groups 208a and 208b when prompted to do so by instructions displayed on the display panel 206. In one exemplary embodiment, a password may comprise four digits, wherein each digit is treated as a separate system variable that can be characterized, for example, by one of a plurality of predetermined numeric values between 0 and 9. Accordingly, a user may enter the password by engaging the first multi-function adjustment button group 208a to select between the first to fourth digits and may further engage the second multi-function adjustment button group 208b to adjust existing values of the selected digits to one of a plurality of predetermined values associated with each selected digit.

In one embodiment, the block-out start time, block-out stop time, and the restricted use day values are adjusted not by the user of the irrigation controller 102, but by non-users such as contractors at the time of installation of the irrigation controller 102, a local or regional authority (e.g., the city water department, etc.), programmers at the time the microcontroller 104 is manufactured/programmed, or the like. Accordingly, and referring now to FIG. 10B, after a non-user has set a water use restriction at S1002 (e.g., by adjusting the block-out start time, block-out stop time, and the restricted use day values), the non-user sets a password at S1004 to prevent users from adjusting water use restrictions programmed into the irrigation controller 102. Subsequently, users may view the programmed water use restriction at S1006.

Figure 19:
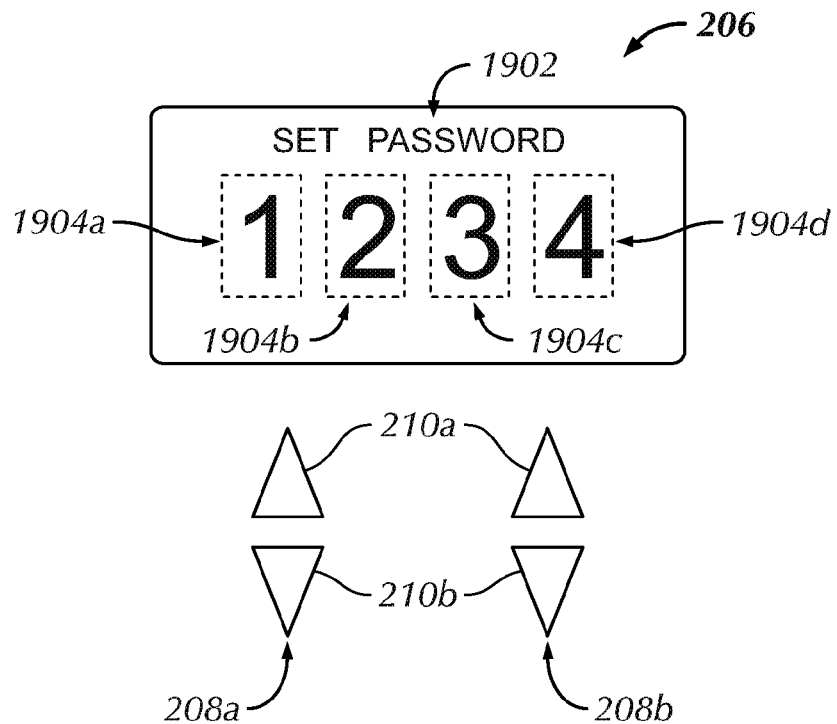
FIG. 19 illustrates one embodiment in which the display panel shown in FIG. 2 is driven to present information upon selection of a set password functionality.

In one embodiment, a password may be set at S1004 by programmers of the microcontroller 104 (e.g., at the time the irrigation controller 102 is manufactured) and stored in, for example, memory 116. In another embodiment, the password may be set by positioning the rotary dial 202 in alignment with a functionality label 204 identifying, for example, a "Special Features" functionality (not shown). Upon selecting the "Special Features" functionality, the display panel 206 may be driven to display one or more features or functionalities that can be selected via the user's further engagement with the first and/or second multi-function adjustment button groups 208a and/or 208b. For example, the display panel 206 may be driven to display a list of selectable features including a set password functionality (e.g., identified upon the display panel 206 by an intuitive label "SET PASSWORD"). After the first and/or second multi-function adjustment button groups 208a and/or 208b have been engaged as described above to select the set password functionality, the display panel 206 can be driven to display information as shown in FIG. 19. In yet another embodiment, the password may be set by engaging one or more of the aforementioned user input devices in a predetermined manner (e.g., pressing the various aforementioned buttons, positioning the rotary dial 202, etc., in a predetermined sequence). Upon engaging the user input devices in the predetermined manner, the set password functionality has been selected and the display panel 206 can be driven to display information as shown in FIG. 19.

As shown in FIG. 19, when the set password functionality is selected, the display panel 206 is driven to display an intuitive functionality label 1902 (e.g., "SET PASSWORD") in addition to first to fourth digits 1904a to 1904d, wherein the password is formed by the combination of the first to fourth digits 1904a to 1904d. As described above, the value of a password digit can vary from between 0 and 9. Accordingly, a non-user may set a password by engaging the first multi-function adjustment button group 208a to select between the first to fourth digits 1904a to 1904d and may further engage the second multi-function adjustment button group 208b to adjust existing values of the selected digits to one of a plurality of predetermined values associated with each selected digit. Although the set password functionality has been discussed above with respect to preventing users from adjusting system variables associated with the water use restrict functionality, it will be appreciated that the set password functionality may implemented in conjunction with any of functionality (or combination thereof) described herein. Accordingly, a password may be set (e.g., entered by a user or by a non-user for the purpose of setting the password) to protect or lock at least one functionality of the irrigation controller 102, e.g., to prevent adjustment of existing values of one or more system variables associated with one or more functionalities or to unlock features or functionality of the irrigation controller 102.

To adjust existing values of password-protected system variables or to unlock password protected features or functionalities of the irrigation controller 102, the user must enter the correct password via, for example, the first and second multi-function groups 208a and 208b when prompted to do so by instructions displayed on the display panel 206 upon selecting a particular functionality via the rotary dial 202. Such instructions may be displayed upon display panel 206 as exemplarily shown in FIG. 20. In another embodiment, a password may be entered by a user (e.g., to unlock password protected features or functionalities of the irrigation controller 102, to adjust values of password-protected system variables) by positioning the rotary dial 202 in alignment with a functionality label 204 identifying, for example, a "Special Features" function (not shown). Upon selecting the "Special Features" functionality, the display panel may be driven to display one or more features or functionalities that can be selected via the user's further engagement with the first and/or second multi-function adjustment button groups 208a and/or 208b. For example, the display panel 206 may be driven to display a list of selectable features including an enter password functionality (e.g., identified upon the display panel 206 by an intuitive label "ENTER PASSWORD"). After the first and/or second multi-function adjustment button groups 208a and/or 208b have been engaged as described above to select the enter password functionality, the display panel 206 can be driven to display information as shown in FIG. 20.

Figure 20:
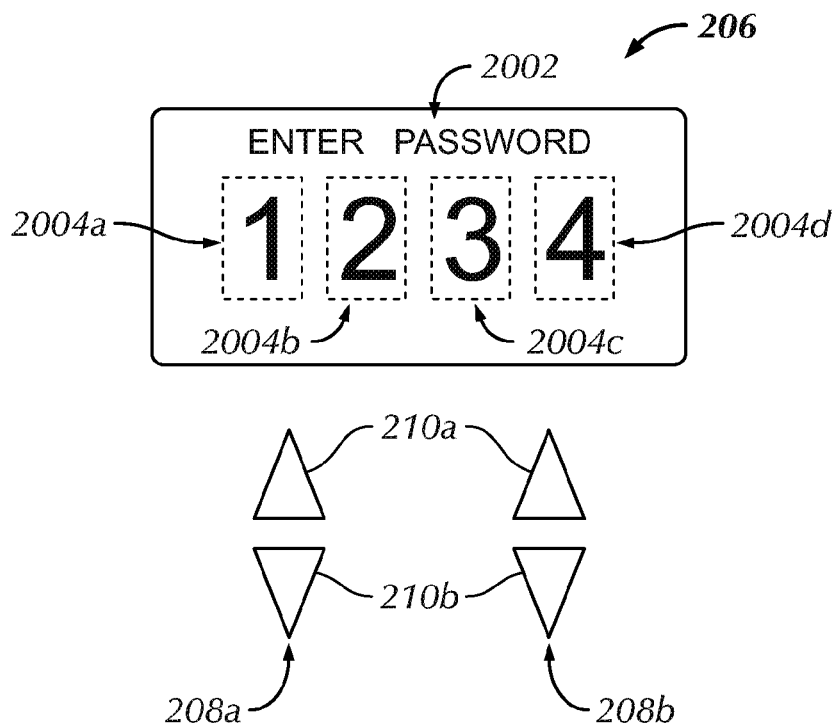
FIG. 20 illustrates one embodiment in which the display panel shown in FIG. 2 is driven to present information enabling a user to enter a password.

As shown in FIG. 20, when the enter password functionality is selected, the display panel 206 is driven to display an intuitive functionality label 2002 (e.g., "ENTER PASSWORD") in addition to first to fourth digits 2004a to 2004d, wherein the password is formed by the combination of the first to fourth digits 2004a to 2004d. As described above, the value of a password digit can vary from between 0 and 9. Accordingly, a user may enter a password by engaging the first multi-function adjustment button group 208a to select between the first to fourth digits 2004a to 2004d and may further engage the second multi-function adjustment button group 208b to adjust existing values of the selected digits to one of a plurality of predetermined values associated with each selected digit.

As described above, the water use restrict functionality prevents water use in irrigation between values 1008 and 1010 corresponding to the start and the stop times, respectively, on the restricted use day(s) displayed upon the display panel 206. Thus, as exemplarily shown in FIG. 10A, water use for irrigation is not permitted between 7:45 AM and 5:15 PM on Sundays, Wednesdays, Fridays, and Saturdays. In another embodiment, however, the water use restrict functionality may be adapted to permit water use in irrigation only between values 1008 and 1010 corresponding to the start and the stop times, respectively, on the restricted use day(s) displayed upon the display panel 206. In such an embodiment, and with reference to FIG. 10A, water use for irrigation would be permitted only between 7:45 AM and 5:15 PM on Sundays, Wednesdays, Fridays, and Saturdays and thus, restricted at all other times. Thus, in this embodiment, FIG. 10A also displays water use restrictions to the user.

Although the water use restrict functionality has been discussed herein with respect to the particularly described irrigation controller 102, it will be appreciated that the water use restrict functionality may be implemented by any suitable irrigation controller, embedded or otherwise, zone-based or otherwise.

Display Functionalities:

According to numerous embodiments, the processing unit 114 may be adapted to implement various display functionalities, which will be discussed in greater detail below with respect to FIGS. 11-16.

Figure 11:
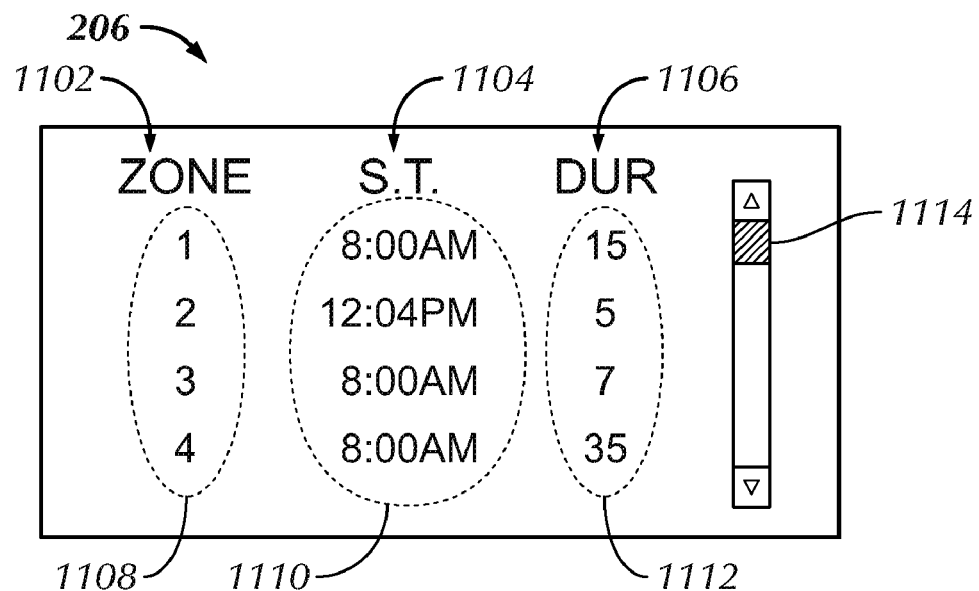
FIGS. 11-16 illustrate several embodiments in which the user display shown in FIG. 2 is driven to present information upon a user's selection of various display functionalities via the user interface.

Per-Zone Start Time/Irrigation Duration Display Functionality:

The per-zone start time/irrigation duration display functionality enables the user to view irrigation parameters for irrigation schedules associated with more than one zone at once. The per-zone start time/irrigation duration display functionality may be selected upon a user positioning the rotary dial 202 in alignment with an appropriate functionality label 204 (not shown). As shown in FIG. 11, when the per-zone start time/irrigation duration display functionality is selected, the display panel 206 is driven to display a zone identification label 1102 (e.g., "ZONE"), an irrigation start time identification label 1104 (e.g., "ST"), and an irrigation duration label 1106 (e.g., "DUR") in addition to values for system variables such as selected zone 1108, irrigation start time 1110, and irrigation duration 1112. In the illustrated embodiment, values for the irrigation zone 1108, irrigation start time 1110, and irrigation duration 1112 are aligned under respective ones of the zone identification, irrigation start time identification, and irrigation duration labels 1102, 1104, and 1106, respectively. In another embodiment, values of system variables arranged in a single row are associated with a single irrigation schedule.

In one embodiment, the display panel 206 may also be driven to display a scroll bar 1114 if, for example, the amount of space required to display the irrigation parameters of all irrigation schedules supported by the irrigation controller 102 exceeds the display area of the display panel 206. In such an embodiment, a user may engage, for example, the first or second multi-function adjustment button groups 208a or 208b, respectively, to view irrigation parameters of irrigation schedules not currently displayed by the display panel 206.

Figure 12:
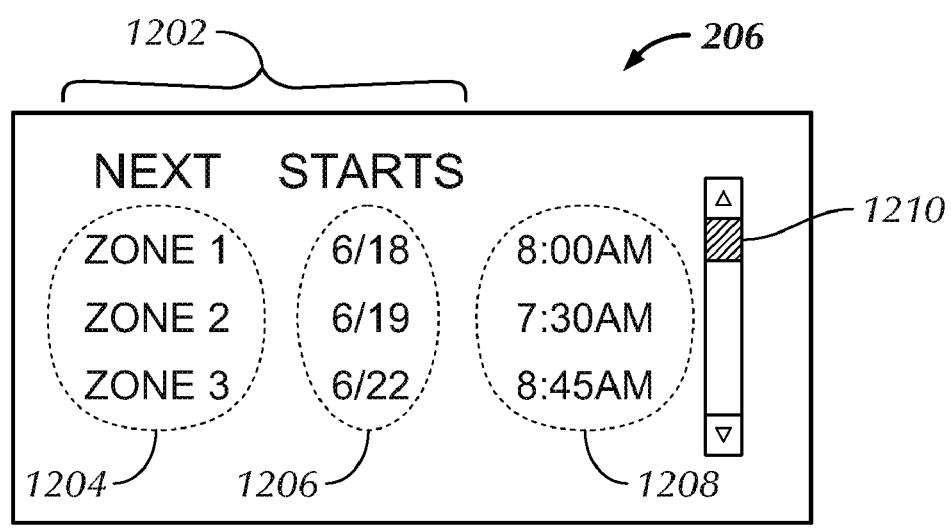

Next Zone Start Time/Start Day Display Functionality:

The next zone start time/start day display functionality enables the user to view the next irrigation start days and irrigation start times of each zone associated with the irrigation controller 102. The next zone start time/start day display functionality may be selected upon a user positioning the rotary dial 202 in alignment with an appropriate functionality label 204 (not shown). As shown in FIG. 12, when the next zone start time/start day display functionality is selected, the display panel 206 is driven to display a next zone start identification label 1202 (e.g., "NEXT STARTS") in addition to values for system variables such as irrigation zone 1204, irrigation start day 1204, and irrigation start time 1208. In the illustrated embodiment, values for the selected zone 1204, irrigation start day 1206, and irrigation start time 1208, are aligned under corresponding ones of the next zone start identification label 1202. In another embodiment, values of system variables arranged in a single row are associated with a single irrigation schedule.

In one embodiment, the display panel 206 may also be driven to display a scroll bar 1210 if, for example, the amount of space required to display the irrigation parameters of all irrigation schedules supported by the irrigation controller 102 exceeds the display area of the display panel 206. In such an embodiment, a user may engage, for example, the first or second multi-function adjustment button groups 208a or 208b, respectively, to view irrigation parameters of irrigation schedules not currently displayed by the display panel 206.

Figure 13:
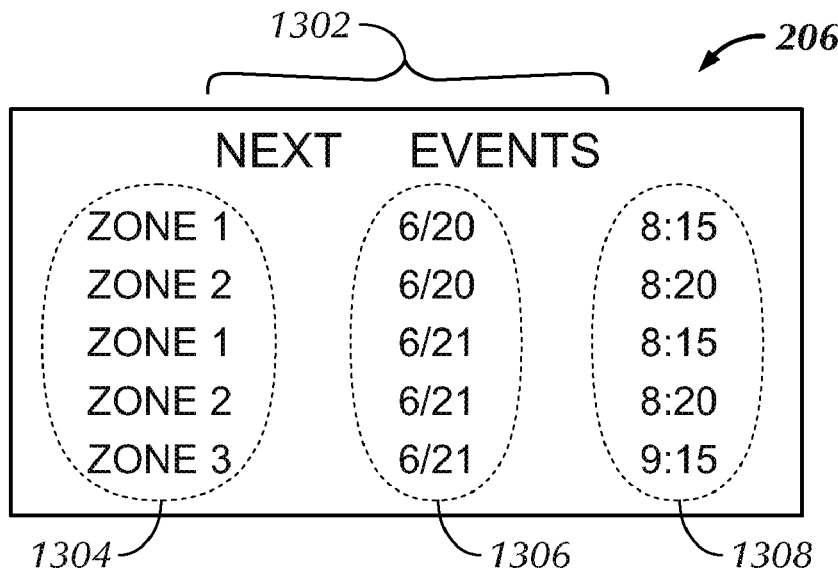

Next Event Display Functionality:

The next event display functionality enables the user to view the next irrigation events of all irrigation schedules executable by the irrigation controller 102. The next event display functionality may be selected upon a user positioning the rotary dial 202 in alignment with an appropriate functionality label 204 (not shown). As shown in FIG. 13, when the next event display functionality is enabled, the display panel 206 is driven to display a next event identification label 1302 (e.g., "NEXT STARTS") in addition to values for system variables such as irrigation zone 1804, irrigation start day 1306, and irrigation start time 1308. In the illustrated embodiment, values for the selected zone 1304, irrigation start day 1306, and irrigation start time 1308, are aligned under the next event identification label 1302. In another embodiment, values of system variables arranged in a single row are associated with a single irrigation schedule.

As described above, the display panel 206 may also be driven to display a scroll bar if, for example, the amount of space required to display the irrigation events exceeds the display area of the display panel 206. In such an embodiment, a user may engage, for example, the first or second multi-function adjustment button groups 208a or 208b, respectively, to view irrigation parameters of irrigation schedules not currently displayed by the display panel 206.

Figure 14:
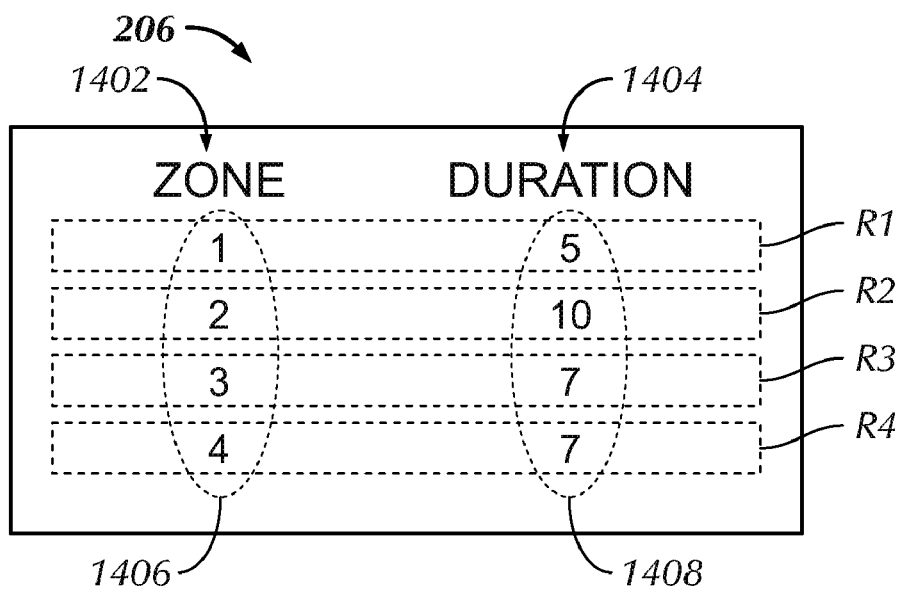

Per-Zone Irrigation Duration Display Functionality:

The per-zone irrigation duration display functionality enables the user to view the irrigation durations associated with irrigation schedules associated with all zones. The per-zone irrigation duration display functionality may be selected upon a user positioning the rotary dial 202 in alignment with an appropriate functionality label 204 (not shown). As shown in FIG. 14, when the per-zone irrigation duration display functionality is enabled, the display panel 206 is driven to display a zone identification label 1402 (e.g., "ZONE") and a duration identification label 1404 (e.g., "DURATION"), in addition to values for system variables such as selected zone 1406, and irrigation duration 1408. In the illustrated embodiment, values for the irrigation zone 1406 and irrigation start day 1408 are aligned under the respective ones of the zone identification and duration identification labels 1402 and 1404, respectively. In another embodiment, values of system variables arranged in a single row are associated with a single irrigation schedule.

As described above, the display panel 206 may also be driven to display a scroll bar if, for example, the amount of space required to display the irrigation parameters exceeds the display area of the display panel 206. In such an embodiment, a user may engage, for example, the first or second multi-function adjustment button groups 208a or 208b, respectively, to view irrigation parameters of irrigation schedules not currently displayed by the display panel 206.

According to numerous embodiments, the display panel 206 may be provided as a color dot-matrix type LCD, capable of visually expressing a plurality of colors, as is well known in the art. In one such embodiment, the display panel 206 may be driven to display irrigation parameters associated with different zones in different colors. For example, as shown in FIG. 14, the display panel 206 may be driven to display a color scheme 1410 wherein irrigation parameters associated with zone 1 (e.g., irrigation parameters displayed in row R1) are displayed in red, irrigation parameters associated with zone 2 (e.g., irrigation parameters displayed in row R2) are displayed in blue, irrigation parameters associated with zone 3 (e.g., irrigation parameters displayed in row R3) are displayed in green, irrigation parameters associated with zone 4 (e.g., irrigation parameters displayed in row R4) are displayed in yellow, and so on. In another embodiment, the display panel 206 may be driven to display different values of system variables, or different ranges thereof, in different colors.

Although use of a color display panel 206 has been discussed herein with respect to the particularly described irrigation controller 102, it will be appreciated that the functionality of the color display panel 206 can be used in conjunction with any suitable irrigation controller, embedded or otherwise, whether in a zone-based irrigation controller or in a program-based irrigation controller. Used in conjunction with a program-based irrigation controller, a color display panel 206 may be driven to display irrigation parameters associated with different irrigation programs in different colors. For example, the color display panel 206 may be incorporated within a program-based irrigation controller driven to display the color scheme wherein irrigation parameters associated with an existing program "A" are displayed in red, irrigation parameters associated with an existing program "B" are displayed in green, irrigation parameters associated with an existing program "C" are displayed in blue, and so on. By driving the color display 206 according to the above-described example, a user can readily determine that program "A" has been applied to zones 1 and 2 (e.g., as evidenced by irrigation parameters displayed in rows R1 and R2 in red), program "C" has been applied to zone 3 (e.g., as evidenced by irrigation parameters displayed in row R3 in green), and program "C" has been applied to zone 4 (e.g., as evidenced by irrigation parameters displayed in row R4 in blue).

The various display functionalities exemplarily described above with respect to FIGS. 11-14 were text based (i.e., information regarding system variables is displayed via use of letters, numbers, and/or other symbols). In other embodiments, however, display functionalities may also be graphically based (i.e., information regarding system variables is displayed via use of charts, graphs, etc.) Exemplary implementations of graphically-based display functionalities are described below with respect to FIGS. 15 and 16.

Figure 15:
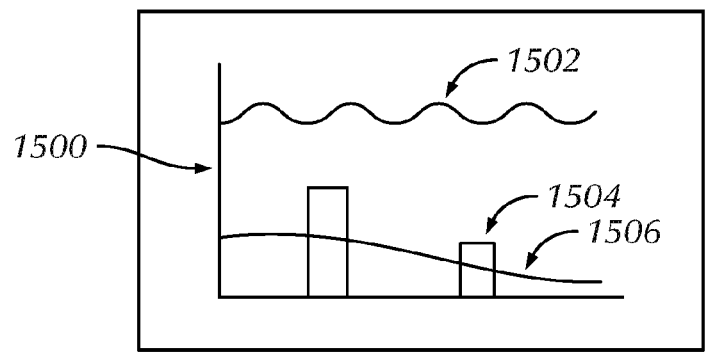

Chart-based Display Functionality:

A chart-based display functionality enables the user to view system variables associated with the irrigation system 100 in a chart-based format, wherein values of system variables are charted against time (i.e., in a time-dependent manner). In this sense, a chart-based display functionality allows historical values of system variables to be displayed to the user. The chart-based display functionality may be selected upon a user positioning the rotary dial 202 in alignment with an appropriate functionality label 204 (not shown). As shown in FIG. 15, when the chart-based display functionality is selected, the display panel 206 is driven to display a chart 2000 that graphs environmental information relating to one or more system variables stored within memory 116 (e.g., temperature 2002, rainfall 2004, wind speed 2006, etc.). In one embodiment, different system variables graphed within chart 2000 may be displayed upon the display panel 206 in different colors. For example, the display panel 206 may be driven to display information relating to temperature 2002 in red, information relating to rainfall 2004 in blue, information relating to wind speed 2006 in green, and so on. In another embodiment, the display panel 206 may be driven to display information relating to different values of system variables, or different ranges thereof, in different colors.

Figure 16:
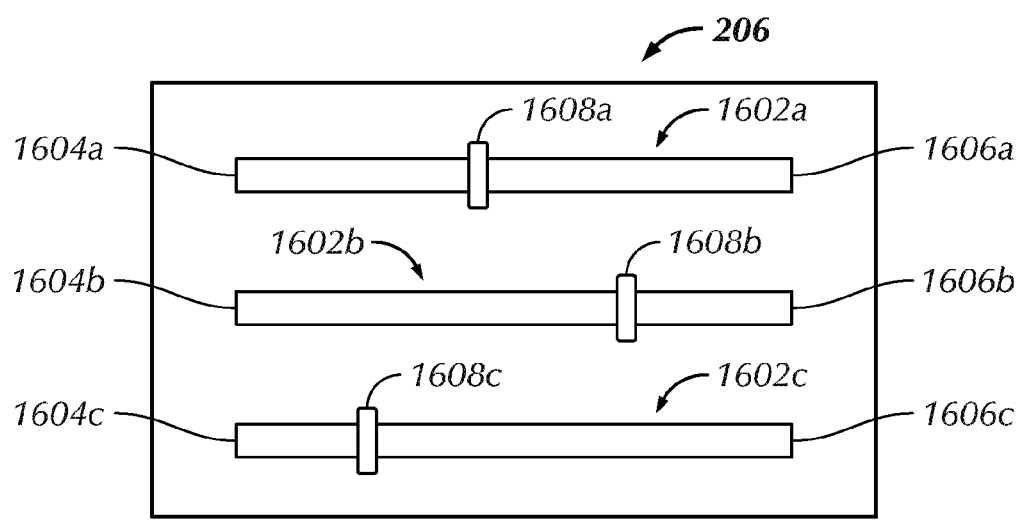

Graduated-value Display Functionality:

A graduated-value display functionality enables the user to view system variables associated with the irrigation system 100 (e.g., temperature, rainfall, wind speed, etc.) in a format in which numerous values of one or more system variables are displayed together as a gradient between two extreme limits. The graduated-value display functionality may be selected upon a user positioning the rotary dial 202 in alignment with an appropriate functionality label 204 (not shown). As shown in FIG. 16, when the graduated-value display functionality is selected, the display panel 206 can be driven to display a plurality of scales (e.g., 2102*a*, 2102*b*, and 2102*c*, generically referred to as scale 2102) that convey information relating to system variables stored within memory 116 (e.g., plant hydration, soil moisture, and temperature, respectively). In one embodiment, each scale 2102 includes a first end 2104 representing a first (e.g., lower) limit to a value associated with a particular system variable, a second end 2106 representing a second (e.g., upper) limit to a value associated with the particular system variable, and a marker 2108 representing a value associated the particular system variable as currently stored within the memory 116.

In one embodiment, the display panel 206 may be driven to display information relating to different values of system variables, or different ranges thereof, in different colors. In another embodiment, the display panel 206 may be driven to display information relating to different system variables in different combinations of colors. As exemplarily described above, scale 2102*a* conveys information relating to plant hydration. Accordingly, the display panel 206 may be driven to display the first end 2104*a* of scale 2102*a*, for example, in yellow/brown indicating insufficient plant hydration, the second end 2106*a*, for example, in green indicating excessive plant hydration, and all points along the scale 2102*a* between the first and second ends 2104*a* and 2106*a*, respectively, in a gradient of colors ranging from yellow/brown to green. Similarly, the display panel 206 may be driven to display the first end 2104*b* of scale 2102*b*, for example, in yellow/brown indicating insufficient soil moisture, the second end 2106*b*, for example, in blue indicating excessive soil moisture, and all points along the scale 2102*b* between the first and second ends 2104*b* and 2106*b*, respectively, in a gradient of colors ranging from yellow/brown to blue. Further, the display panel 206 may be driven to display the first end 2104*c* of scale 2102*c*, for example, in blue indicating a low temperature, the second end 2106*c*, for example, in red indicating a high temperature, and all points along the scale 2102*c* between the first and second ends 2104*c* and 2106*c*, respectively, in a gradient of colors ranging from blue to red. The display panel 206 may further be driven to display markers 2108*a*, 2108*b*, and 2108*c* along scales 2102*a*, 2102*b*, and 2102*c*, respectively, to visually convey values (e.g., approximated, measured, absolute, relative, etc.) of plant hydration, soil moisture, and temperature, respectively.

The user interface 200 has been exemplarily described above with respect to FIGS. 2-16 as comprising, among other elements, a dot-matrix type LCD 206, an irrigation frequency adjustment button group 214 (comprising the first and second irrigation frequency adjustment buttons 216*a* and 216*b*, respectively), and an irrigation start day adjustment button group 222 (comprising the first and second irrigation start day adjustment buttons 224*a* and 224*b*, respectively). In another embodiment, however, a user interface of the input unit 106 may comprise a segment-type LCD instead of a dot matrix-type LCD. In another embodiment, a user interface of the input unit 106 may comprise a plurality of irrigation frequency selection buttons corresponding in number to the plurality of predetermined irrigation frequencies. In another embodiment, a user interface of the input unit 106 may comprise a plurality of irrigation start day selection buttons corresponding in number to the plurality of predetermined irrigation start days. An exemplary user interface incorporating elements mentioned above with respect to such other embodiments will now be described in greater detail with respect to FIG. 17.

Figure 17:
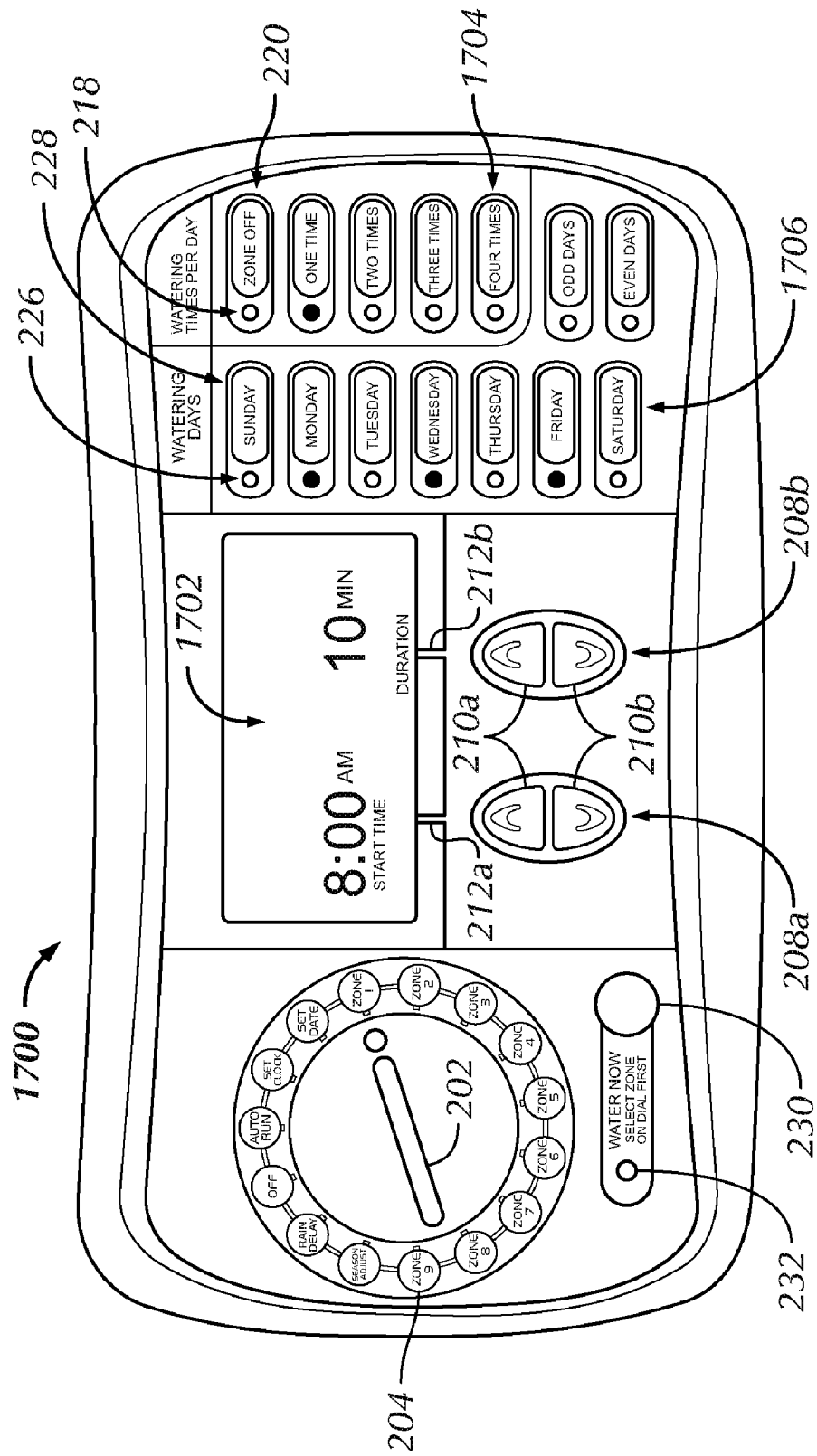
FIG. 17 illustrates another embodiment of a user interface of an irrigation controller.
Figure 18:
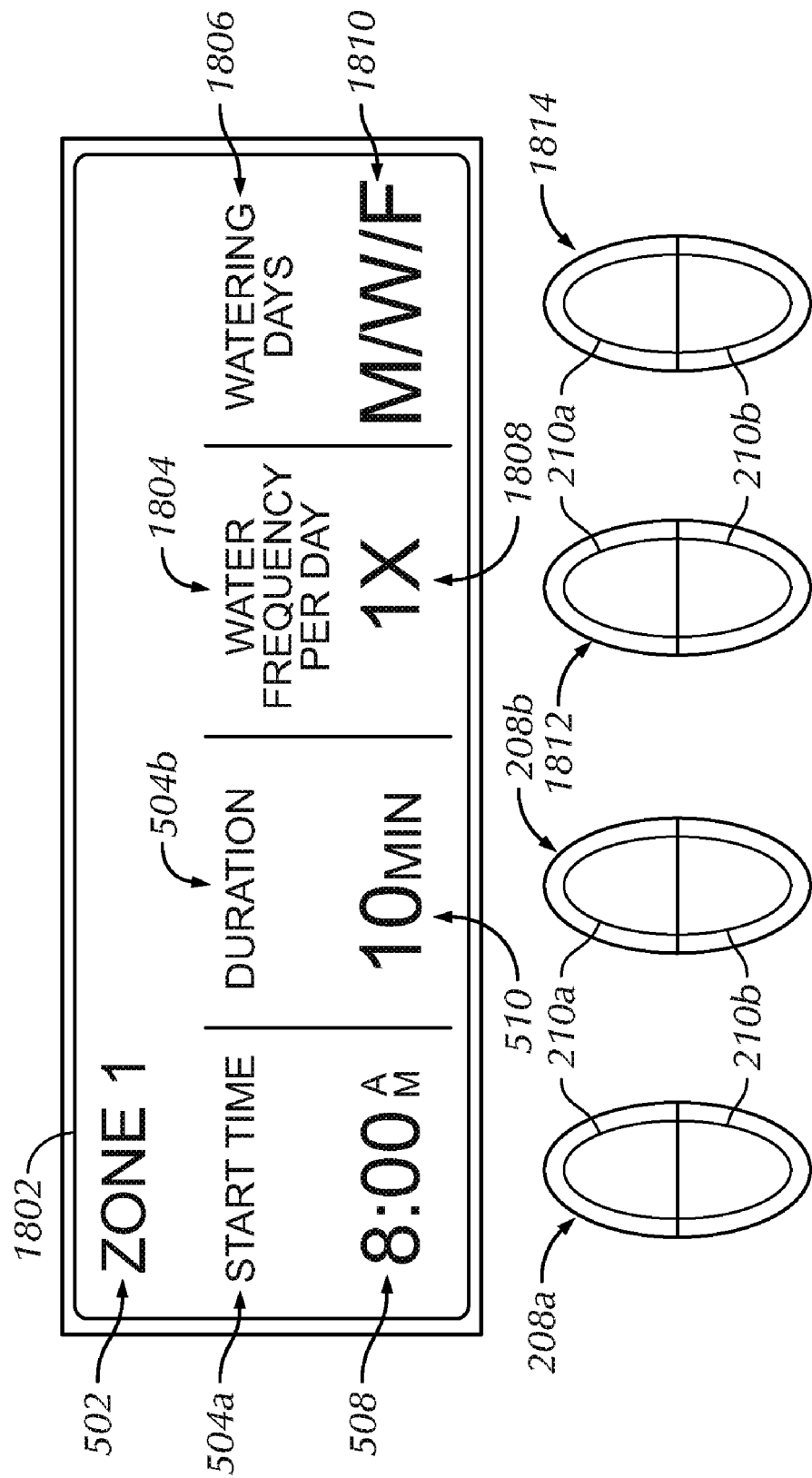
FIG. 18 illustrates another embodiment of a user interface of an irrigation controller.

As exemplarily shown in FIG. 17, the user interface 1700 includes the following elements as previously discussed with respect to FIG. 2: the rotary dial 202, the plurality of functionality labels 204, the first and second multi-function adjustment button groups 208*a* and 208*b*, respectively, (each containing first and second multi-function adjustment buttons 210*a* and 210*b*, respectively), the first and second system variable indicators 212*a* and 212*b*, respectively, the plurality of irrigation frequency indicators 218 (e.g., LEDs), the plurality of irrigation frequency labels 220, the plurality of irrigation start day indicators 226 (e.g., LEDs), the plurality of irrigation start day labels 228, and the manual start button 230 and manual select indicator 232 (e.g., an LED). It will be appreciated that the general purpose and effects of a user's engagement with the aforementioned elements as applied to the user interface shown in FIG. 17 is substantially the same as applied to the user interface 200 exemplarily shown in FIG. 2.

As further illustrated, the user interface 1700 may additionally comprise a segment-type LCD 1702 (herein referred to as the "display panel 1702"), a plurality of irrigation frequency selection buttons 1704, and a plurality of irrigation start day selection buttons 1706.

According to numerous embodiments, the display panel 1702 comprises LCD segments that, when activated, display information as previously discussed with respect to the display panel 206.

As exemplarily illustrated in FIG. 17, each irrigation frequency label 220 is arranged upon a corresponding irrigation frequency selection button 1704. Accordingly, the user interface 1700 comprises a plurality of irrigation frequency selection buttons 1704 corresponding in number to the plurality of predetermined irrigation frequencies. In the illustrated embodiment, each irrigation start day label 228 is arranged upon a corresponding irrigation start day selection button 1706. Accordingly, the user interface 1700 comprises a plurality of irrigation start day selection buttons 1706 corresponding in number to a plurality of predetermined irrigation start days.

Similar to the first and second irrigation frequency adjustment buttons 216*a* and 216*b*, respectively, described above with respect to FIG. 2, each of the plurality of irrigation frequency selection buttons 1704 may be engaged (e.g., pressed) by a user to adjust an existing value of an irrigation frequency to one of a plurality of predetermined irrigation frequency values.

As exemplarily illustrated in FIG. 17, pre-associated irrigation frequency values include zero times per irrigation start day (e.g., as identified by the irrigation frequency label 220 "ZONE OFF"), once per irrigation start day (e.g., as identified by the irrigation frequency label 220 "ONE TIME"), twice per irrigation start day (e.g., as identified by the irrigation frequency label 220 "TWO TIMES"), three times per irrigation start day (e.g., as identified by the irrigation frequency label 220 "THREE TIMES"), and four times per irrigation start day (e.g., as identified by the irrigation frequency label 220 "FOUR TIMES").

Similar to the first and second irrigation start day adjustment buttons 224*a* and 224*b*, respectively, described above with respect to FIG. 2, each of the plurality of irrigation start day selection buttons 1706 may be engaged (e.g., pressed) by a user to adjust an existing value of an irrigation start day to one of a plurality of irrigation start days.

As exemplarily illustrated in FIG. 17, pre-associated irrigation start day values include Sundays (e.g., as identified by the irrigation start day label 228 "SUNDAY"), Mondays (e.g., as identified by the irrigation start day label 228 "MONDAY"), Tuesdays (e.g., as identified by the irrigation start day label 228 "TUESDAY"), Wednesdays (e.g., as identified by the irrigation start day label 228 "WEDNESDAY"), Thursdays (e.g., as identified by the irrigation start day label 228 "THURSDAY"), Fridays (e.g., as identified by the irrigation start day label 228 "FRIDAY"), Saturdays (e.g., as identified by the irrigation start day label 228 "SATURDAY"), Sundays (e.g., as identified by the irrigation start day label 228 "SUNDAY"), odd days of the week (e.g., as identified by the irrigation start day label 228 "ODD DAYS"), and even days of the week (e.g., as identified by the irrigation start day label 228 "EVEN DAYS").

According to numerous embodiments, user interface 2200 allows a user to select the many of the functionalities described above with reference to the FIGS. above and further permits the user to adjust system variables via the first and second multi-function adjustment button groups 208a and 208b, respectively and/or via the plurality of irrigation frequency and start day buttons 2204 and 2206, respectively.

As described above with respect to FIGS. 2 and 17, a user interface may be provided as, among other elements, a combination of a display screen (e.g., a dot matrix-type LCD or a segment-type LCD) and a plurality of illuminatable indicators (e.g., irrigation frequency and start day indicators 218 and 226) It will be appreciated, however, that the user interface of irrigation controller 102 may alternatively be provided without the plurality of illuminatable indicators. For example, and with reference to FIG. 18, the user interface may be provided with a display screen 1802 adapted to display, when a user has positioned the rotary dial 202 in alignment with a functionality label 204 identifying a zone-specific irrigation schedule adjustment functionality associated with predefined zone 1 (e.g., "ZONE 1"), the aforementioned intuitive functionality title 502 (e.g., "ZONE 1"), intuitive irrigation start time status label 504a (e.g., "START TIME"), an intuitive irrigation duration label 504b (e.g., "DURATION"), an intuitive irrigation frequency label 1804 (e.g., "WATERING FREQUENCY PER DAY"), and an intuitive irrigation start day label 1806 (e.g., "WATERING DAYS") in addition to existing values of system variables such as the irrigation start time 508, irrigation duration 510, irrigation frequency 1808, and irrigation start day 1810. The user interface may further comprise the aforementioned first and second multi-function adjustment button groups 208a and 208b in addition to an irrigation frequency adjustment button group 1812 and an irrigation start day adjustment button group 1814. Although not explicitly labeled, the irrigation frequency and start day adjustment button groups 1812 and 1814 may, for example, each comprise the aforementioned first and second adjustment buttons 210a and 210b.

In the illustrated embodiment, the irrigation start time status label 504a is displayed upon the display screen 1802 at a location proximate to the first multi-function adjustment button group 208a, the irrigation duration label 504b is displayed upon the display screen 1802 at a location proximate to the second multi-function adjustment button group 208b, the irrigation frequency label 1804 is displayed upon the display screen 1802 at a location proximate to the irrigation frequency adjustment button group 1812, and the irrigation start day label 1806 is displayed upon the display screen 1802 at a location proximate to the irrigation start day adjustment button group 1814.

In one embodiment, the functionality of the multi-function adjustment button groups depends on other user inputs, such as based on the positioning of a rotary dial, such as described above. As mentioned above, values which a particular multi-function adjustment button group can adjust when engaged by a user are defined based upon the proximity of intuitive labels and/or adjustable values to the particular multi-function adjustment button group. Accordingly, existing values of the irrigation start time 508 may be adjusted upon the user's further engagement with the first multi-function adjustment button group 208a, existing values of the irrigation duration 510 may be adjusted upon the user's further engagement with the second multi-function adjustment button group 208b, existing values of the irrigation frequency 1808 may be adjusted upon the user's further engagement with the irrigation frequency adjustment button group 1812, and existing values of the irrigation start day 1810 may be adjusted upon the user's further engagement with the irrigation start day adjustment button group 1814.

While the embodiments described herein have been described by means of specific examples and applications thereof, numerous modifications and variations could be made thereto by those skilled in the art without departing from the scope of the invention set forth in the claims.

What is claimed is:

1. An irrigation controller, comprising:
   a housing;
   a microcontroller within the housing and configured to store and execute an irrigation schedule;
   a valve driver coupled to the microcontroller and configured to output a zone activation signal to an actuatable zone valve in response to signaling from the microcontroller; and
   a user interface comprising:
      a plurality of user input devices coupled to the microcontroller and configured to provide signaling to the microcontroller based upon a user's engagement therewith, the plurality of user input devices configured to allow the user to create an irrigation schedule; and
      a user display coupled to the microcontroller and configured to display irrigation parameters associated with the irrigation schedule, the user display comprising a display screen, wherein,
      the microcontroller is configured to cause the user display to display all system variables associated with the irrigation schedule together to the user, the irrigation schedule corresponding to a single irrigation zone,
      the all system variables comprise an irrigation start day, an irrigation start time, watering frequency per irrigation start day, and a duration associated with the irrigation schedule.

2. The irrigation controller of claim 1, wherein the user display includes a plurality of illuminatable indicators.

3. The irrigation controller of claim 1, wherein the user display includes a rotary dial.

4. An irrigation controller, comprising:
   a housing;
   a microcontroller within the housing and configured to modify an existing irrigation schedule and execute the modified irrigation schedule;
   a valve driver coupled to the microcontroller and configured to output a zone activation signal to an actuatable zone valve in response to signaling from the microcontroller; and a user interface comprising:
- a plurality of user input devices coupled to the microcontroller and configured to provide signaling to the microcontroller based upon a user's engagement therewith; and
- a user display coupled to the microcontroller and configured to display an irrigation parameter associated with an irrigation schedule, wherein
  the microcontroller is configured to cause the user display to display a variable irrigation duration adjustment schedule associated with the existing irrigation schedule.

5. The irrigation controller of claim 4, wherein the user display is configured to display the variable irrigation duration adjustment schedule in a graphical format.

6. The irrigation controller of claim 4, wherein the plurality of user input devices are configured to allow the user to modify an irrigation duration of an existing irrigation schedule based upon a current month-of-year.

7. The irrigation controller of claim 4 wherein the microcontroller is configured to automatically adjust a first duration of the existing irrigation schedule in accordance with the variable irrigation duration adjustment schedule.

8. The irrigation controller of claim 4 wherein the microcontroller is configured to automatically adjust a first duration of the existing irrigation schedule to different ones of a plurality of duration values in accordance with the variable irrigation duration adjustment schedule, each of the different ones of the plurality of duration values corresponding to a different time periods within a year.

9. An irrigation controller, comprising:
a housing;
a microcontroller within the housing and configured to store and execute an irrigation schedule, wherein execution of the irrigation schedule is suspendable for an adjustable period of time;
a zone driver coupled to the microcontroller and configured to output a zone activation signal to an actuatable zone valve in response to signaling from the microcontroller; and
a user interface comprising:
- a plurality of user input devices coupled to the microcontroller and configured to provide signaling to the microcontroller based upon a user's engagement therewith; and
- a user display coupled to the microcontroller and configured to display irrigation parameters associated with the irrigation schedule, wherein
  in the event execution of the irrigation schedule is suspended for the adjustable period of time, the microcontroller is configured to cause the user display to display a numeric indication of an amount of time remaining until the suspension is removed.

10. The irrigation controller of claim 9, wherein the numeric indication of the amount of time remaining comprises a time period of less than one day.

11. The irrigation controller of claim 9, wherein the numeric indication of the amount of time remaining comprises a time period of less than or equal to one hour.

12. The irrigation controller of claim 9, wherein the numeric indication of the amount of time remaining comprises an indication of a number of hours, minutes and seconds remaining until the suspension is removed.

13. An irrigation controller, comprising:
a housing;
a microcontroller within the housing and configured to store and execute an irrigation schedule;
a valve driver coupled to the microcontroller and configured to output a zone activation signal to an actuatable zone valve in response to signaling from the microcontroller; and
a user interface comprising:
- a dedicated language adjustment input coupled to the microcontroller and configured to provide signaling to the microcontroller based upon a user's engagement therewith; and
- a user display coupled to the microcontroller and configured to display irrigation parameters associated with the irrigation schedule, the user display comprising a display screen, wherein
  the microcontroller is configured to cause the user display to display information to the user in different languages based upon the user's engagement with the dedicated language adjustment input.

14. The irrigation controller of claim 13, wherein the microcontroller is configured to cause the user display to adjust a language from one to another of a plurality of languages in which the information is displayed to the user upon the user's engagement with the dedicated language adjustment input.

15. The irrigation controller of claim 13, wherein upon successive user engagements with the dedicated language adjustment input, the microcontroller is configured to cause the user display to successively change a language in which the information is displayed to the user to a successive one of a plurality of languages.

16. The irrigation controller of claim 13, wherein the dedicated language adjustment input is a single function input and has no other purpose.

17. The irrigation controller of claim 13, wherein the dedicated language adjustment input comprises a single button.

18. The irrigation controller of claim 13, the microcontroller is configured to cause the user display to display the information to the user in the different languages in a predetermined order based upon the user's successive engagement with the dedicated language adjustment input.

19. The irrigation controller of claim 13, the microcontroller is configured to cause the user display to display the information to the user in the different languages based upon the user's engagement with the dedicated language adjustment input and without requiring that the user navigate menus in a currently displayed language.

20. The irrigation controller of claim 13, the microcontroller is configured to cause the user display to display the information to the user in the different languages based upon the user's engagement with the dedicated language adjustment input and without requiring that the user select a given language from a list of the different languages.

21. An irrigation controller, comprising:
a housing;
a microcontroller within the housing and configured to store and execute an irrigation schedule;
a valve driver coupled to the microcontroller and configured to output a zone activation signal to an actuatable zone valve in response to signaling from the microcontroller; and
a user interface comprising:
- a display screen coupled to the microcontroller and configured to display irrigation parameters associated with the irrigation schedule; and
- a plurality of non-labeled user input devices proximate to the display screen coupled to the microcontroller and configured to provide signaling to the microcontroller based upon a user's engagement therewith, the plurality of non-labeled user input devices configured to allow the user to create at least in part an irrigation schedule, wherein the microcontroller is configured to cause information to be displayed upon the display screen, wherein signaling by each of the plurality of non-labeled user input devices corresponds to information displayed upon the display screen at a location proximate to a corresponding non-labeled user input device.

22. The irrigation controller of claim 21, wherein the plurality of the non-labeled user input devices proximate to the display screen comprise at least one pair of the non-labeled user input devices, wherein the microcontroller is configured to cause the information to be displayed upon the display screen, the information including a variable corresponding to each of the at least one pair of the non-labeled user input devices, a given variable displayed at the location proximate to a given pair of the non-labeled user input devices, wherein user engagement with a first one of the given pair of the non-labeled user input devices increments the variable, and user engagement with a second one of the given pair of the non-labeled user input devices decrements the variable.

23. The irrigation controller of claim 21, wherein the plurality of the non-labeled user input devices are located relative to the display screen so that they are aligned with the information display upon the display screen.

24. The irrigation controller of claim 21, wherein the microcontroller is configured to cause the information to be displayed upon the display screen, the information including a variable corresponding to each of the plurality of non-labeled user input devices, each variable displayed at the location proximate to its corresponding non-labeled user input device;

wherein user engagement with each of the plurality of the non-labeled user input devices adjusts the variable.

25. The irrigation controller of claim 21 wherein the plurality of non-labeled user input devices are separate from and proximate to the display screen.

26. The irrigation controller of claim 21 wherein the plurality of non-labeled user input devices are configured to provide the signaling to the microprocessor based on the user's mechanical and physically depressible engagement therewith.

27. An irrigation controller comprising:
a housing;
a microcontroller within the housing and configured to store and execute an irrigation schedule;
a valve driver coupled to the microcontroller and configured to output a zone activation signal to an actuatable zone valve in response to signaling from the microcontroller; and
a user interface comprising:
a plurality of user input devices coupled to the microcontroller and configured to provide signaling to the microcontroller based upon a user's engagement therewith, the plurality of user input devices configured to allow the user to create an irrigation schedule; and
a user display coupled to the microcontroller and configured to display irrigation parameters associated with the irrigation schedule, the user display comprising a display screen,
wherein the microcontroller is configured to cause the user display to simultaneously display all system variables associated with the irrigation schedule together to the user,
the all system variables comprise an irrigation start day, an irrigation start time, watering frequency per irrigation start day, and a duration associated with the irrigation schedule.

28. An irrigation controller, comprising:
a housing;
a microcontroller within the housing and configured to store and execute an irrigation schedule;
a valve driver coupled to the microcontroller and configured to output a zone activation signal to an actuatable zone valve in response to signaling from the microcontroller; and
a user interface comprising:
a plurality of user input devices coupled to the microcontroller and configured to provide signaling to the microcontroller based upon a user's engagement therewith, the plurality of user input devices configured to allow the user to create an irrigation schedule for each of a plurality of irrigation zones; and
a user display coupled to the microcontroller and configured to display irrigation parameters associated with irrigation schedules, the user display comprising a display screen, and
wherein, upon user selection of a given irrigation zone by the user, the microcontroller is configured to cause the user display to display, for the given irrigation zone, all system variables associated with the irrigation schedule of the given irrigation zone together to the user without further user manipulation of the user interface;
the all system variables comprising an irrigation start day, an irrigation start time, a watering frequency per irrigation start day, and a duration associated with the irrigation schedule.

* * * * *